(12) United States Patent
Odaka

(10) Patent No.: US 11,280,409 B2
(45) Date of Patent: Mar. 22, 2022

(54) METHOD FOR PRODUCING PISTON ASSEMBLY AND HYDRAULIC FLUID DEVICE

(71) Applicant: SMC CORPORATION, Chiyoda-ku (JP)

(72) Inventor: Tsukasa Odaka, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 525 days.

(21) Appl. No.: 16/324,428

(22) PCT Filed: Jun. 27, 2017

(86) PCT No.: PCT/JP2017/023527
§ 371 (c)(1),
(2) Date: Feb. 8, 2019

(87) PCT Pub. No.: WO2018/030014
PCT Pub. Date: Feb. 15, 2018

(65) Prior Publication Data
US 2021/0285544 A1 Sep. 16, 2021

(30) Foreign Application Priority Data
Aug. 10, 2016 (JP) .............................. JP2016-157631

(51) Int. Cl.
*F16J 9/20* (2006.01)
(52) U.S. Cl.
CPC ....................................... *F16J 9/20* (2013.01)

(58) Field of Classification Search
CPC ........ F16J 9/20; F16J 1/005; F16J 1/10; F16J 1/12; F02F 3/00; F02F 3/0015;
(Continued)

(56) References Cited

U.S. PATENT DOCUMENTS 3,391,614 A 7/1968 Kampert et al.
3,887,301 A 6/1975 Henkel
(Continued)

FOREIGN PATENT DOCUMENTS

CN 2793449 Y 7/2006
CN 101218436 A 7/2008
(Continued)

OTHER PUBLICATIONS

Office Action dated Sep. 17, 2019 in Japanese Patent Application No. 2016-157593, citing document AO therein, 6 pages (with unedited computer generated English translation).
(Continued)

*Primary Examiner* — Grant Moubry
(74) *Attorney, Agent, or Firm* — Oblon, McClelland, Maier & Neustadt, L.L.P.

(57) ABSTRACT

A hydraulic fluid cylinder is equipped with a cylinder tube, a piston unit, and a piston rod. The piston unit has a gasket and a piston body comprising a plurality of members and provided with a gasket-mounting groove. The piston body has a first piston member which projects to the outside from the piston rod, and also has a second piston member positioned so as to be adjacent to the first piston member. The gasket-mounting groove is formed from a combination of at least two members.

14 Claims, 14 Drawing Sheets

(58) Field of Classification Search
CPC ........ F02F 3/0023; F02F 3/003; F02F 3/0084; F02F 5/00; F15B 21/00; F15B 15/1452; F15B 15/14; F15B 15/2861; F15B 2201/312

See application file for complete search history.

(56) References Cited

U.S. PATENT DOCUMENTS

| | | | |
|---|---|---|---|
| 4,735,129 | A | 4/1988 | Sjoberg |
| 7,650,828 | B2 | 1/2010 | Rau et al. |
| 8,312,805 | B1* | 11/2012 | Blume ............... F16J 1/008 92/240 |
| 9,822,877 | B2 | 11/2017 | Koontz |
| 10,851,813 | B2* | 12/2020 | Odaka ............. F15B 15/2861 |
| 2006/0197389 | A1 | 9/2006 | Terasaki |
| 2010/0314838 | A1* | 12/2010 | Slack ................. F16J 15/48 277/520 |
| 2013/0336827 | A1* | 12/2013 | Ishibashi ......... F15B 15/1438 417/491 |
| 2015/0075368 | A1 | 3/2015 | Koontz |
| 2019/0170167 | A1* | 6/2019 | Odaka ............... F15B 15/28 |

FOREIGN PATENT DOCUMENTS

| | | |
|---|---|---|
| CN | 201599273 U | 10/2010 |
| CN | 202628656 U | 12/2012 |
| CN | 2 509 016 C2 | 3/2014 |
| CN | 105041772 A | 11/2015 |
| CN | 105387118 A | 3/2016 |
| CN | 205117882 U | 3/2016 |
| EP | 1 867 880 A1 | 12/2007 |
| JP | 37-25908 U | 9/1962 |
| JP | 54-34892 U1 | 3/1979 |
| JP | 57-6803 Y2 | 2/1982 |
| JP | 63-157509 U | 10/1988 |
| JP | 63-195960 U | 12/1988 |
| JP | 10-2416 A | 1/1998 |
| JP | 11-82424 A | 3/1999 |
| JP | 11-230229 A | 8/1999 |
| JP | 2000-233333 A | 8/2000 |
| JP | 2003-120602 A | 4/2003 |
| JP | 2006-242341 A | 9/2006 |
| JP | 2011-185343 A | 9/2011 |
| JP | 2012-2325 A | 1/2012 |
| JP | 5435434 B2 | 3/2014 |
| TW | M446250 U1 | 2/2013 |
| WO | WO 2013/026508 A1 | 2/2013 |
| WO | WO 2013/026508 A4 | 2/2013 |
| WO | WO 2015/071675 A2 | 5/2015 |

OTHER PUBLICATIONS

Combined Chinese Office Action and Search Report dated Nov. 1, 2019, in Patent Application No. 201780048873.1 (with English translation), citing document AO therein, 16 pages.
Combined Chinese Office Action and Search Report dated Nov. 1, 2019, in Patent Application No. 201780048869.5 (with English translation), citing documents AA and AP therein, 16 pages.
Japanese Office Action dated Nov. 19, 2019 in Patent Application No. 2016-157593 (with English translation), citing document AQ therein, 6 pages.
Indian Office Action dated Mar. 22, 2021 in Indian Patent Application No. 201947009110, citing documents AA-AB and AO-AQ therein, 5 pages.
Combined Chinese Office Action and Search Report dated Nov. 15, 2019 in corresponding Chinese Patent Application No. 201780048860.4 (with Partial English Translation and English Translation of Category of Cited Documents) citing documents AO-AQ therein, 10 pages.
Combined Russian Office Action and Search Report dated Oct. 30, 2019 in corresponding Russian Patent Application No. 2019106679/06(012905), (with English Translation), citing document AR therein, 12 pages.
Korean Office Action dated Apr. 17, 2020, in Patent Application No. 10-2019-7006867, citing documents AA and AP-AQ therein, 13 pages (with unedited computer generated English translation).
Indian Office Action dated Apr. 20, 2020, in Patent Application No. 201947009109, citing documents AO and AR therein, 5 pages.
Combined Chinese Office Action and Search Report dated Apr. 29, 2020 in Chinese Patent Application No. 201780048869.5 (with unedited computer generated English translation and English translation of Category of Cited Documents), citing document AO therein, 18 pages.
Combined Chinese Office Action and Search Report dated May 11, 2020 in Chinese Patent Application No. 201780048873.1 (with unedited computer generated English translation and English translation of Category of Cited Documents), citing document AP therein, 18 pages.
International Search Report dated Aug. 1, 2017 in PCT/JP2017/023527 filed on Jun. 27, 2017.
U.S. Appl. No. 16/324,428, filed Feb. 8, 2019, Tsukasa Odaka.
U.S. Appl. No. 16/324,297, filed Feb. 8, 2019, Tsukasa Odaka.
U.S. Appl. No. 16/324,432, filed Feb. 8, 2019, Tsukasa Odaka.

* cited by examiner

10A

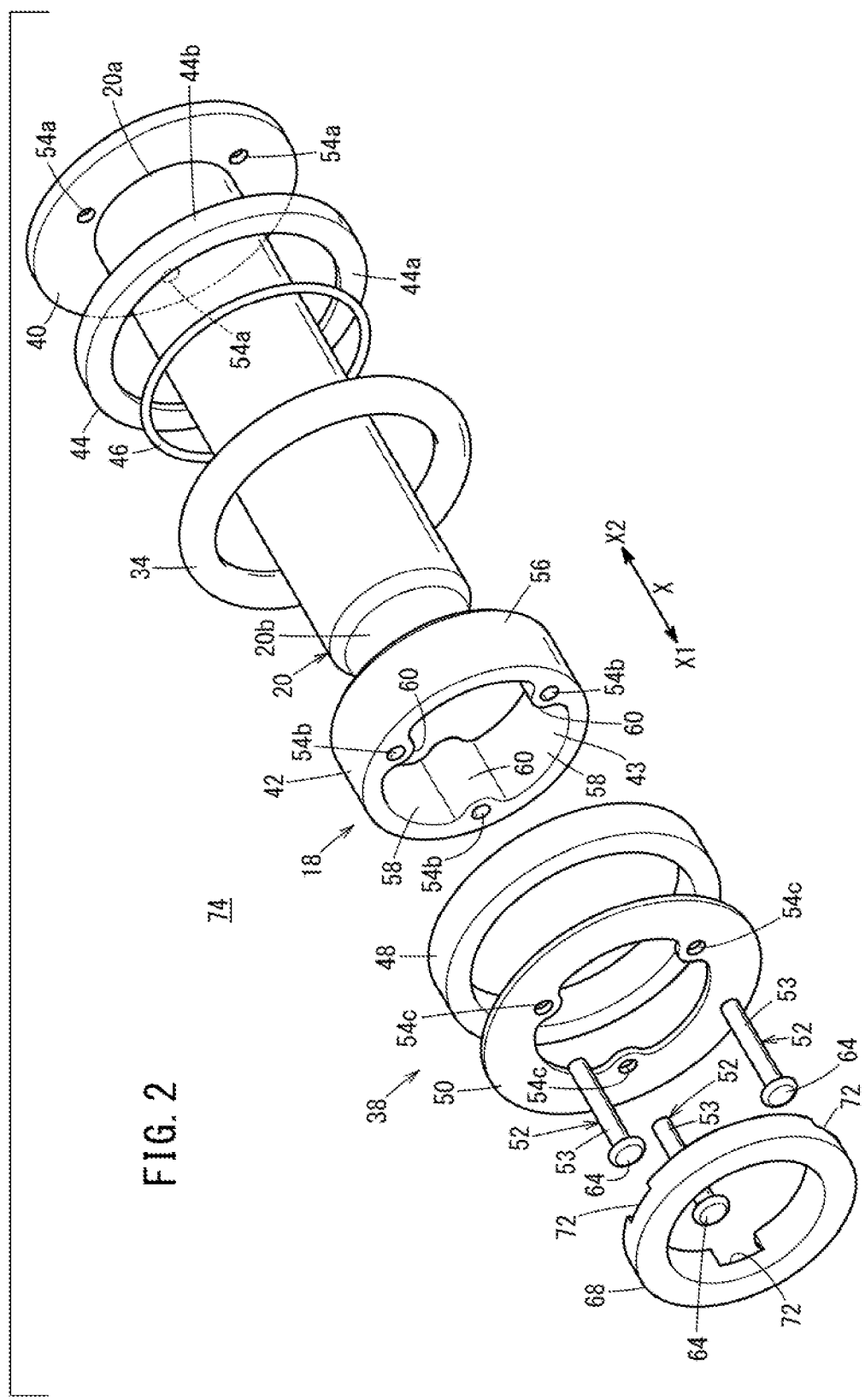

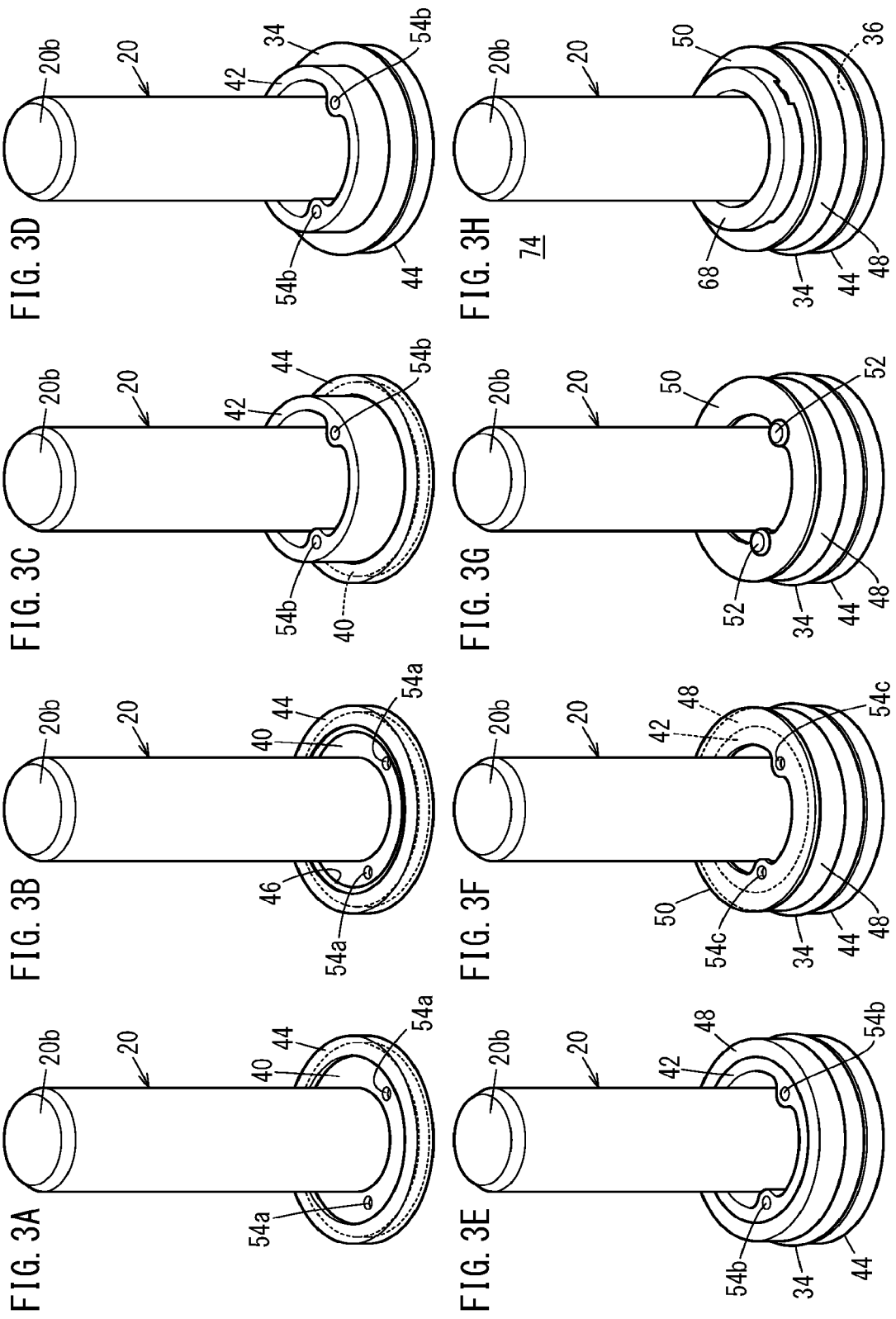

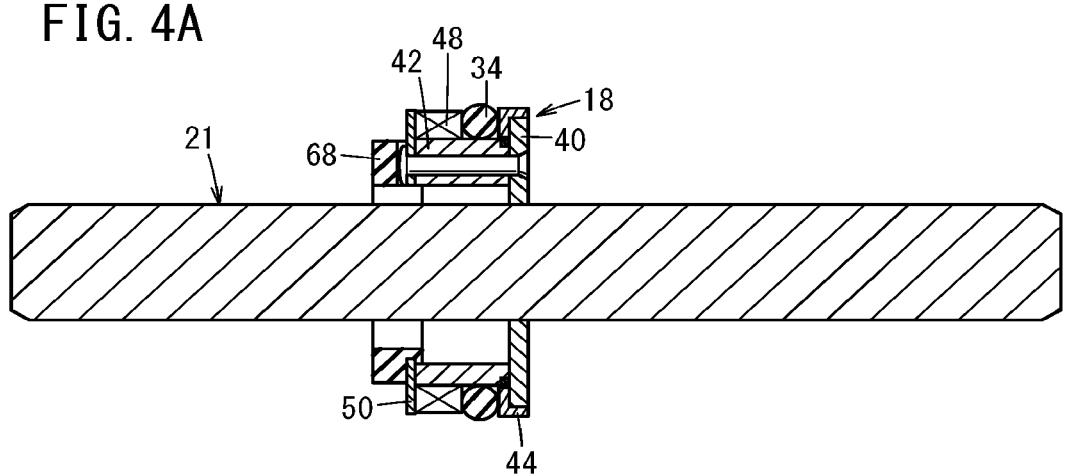
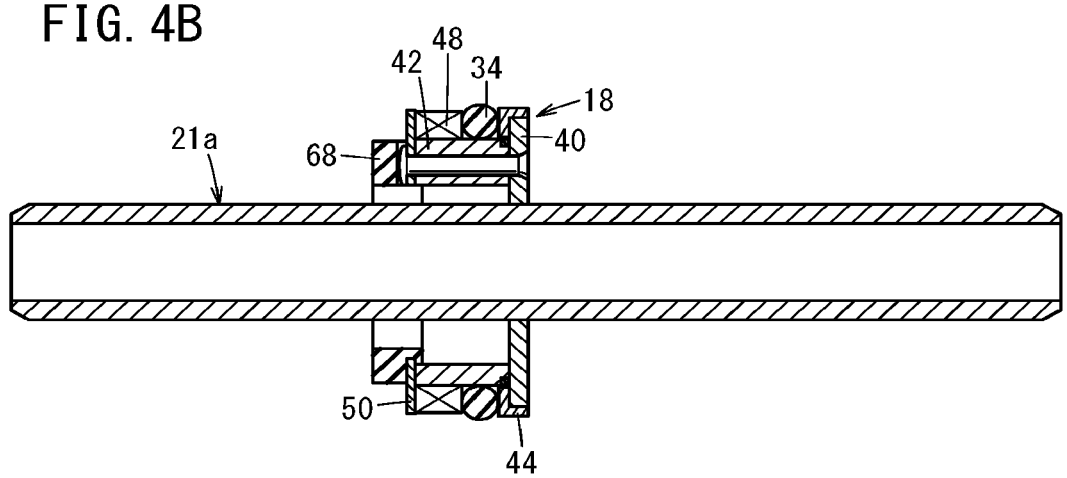

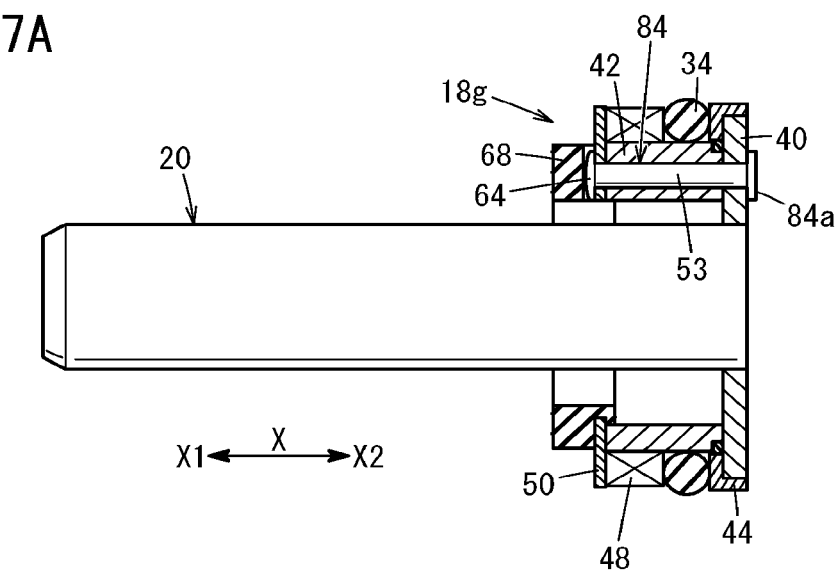
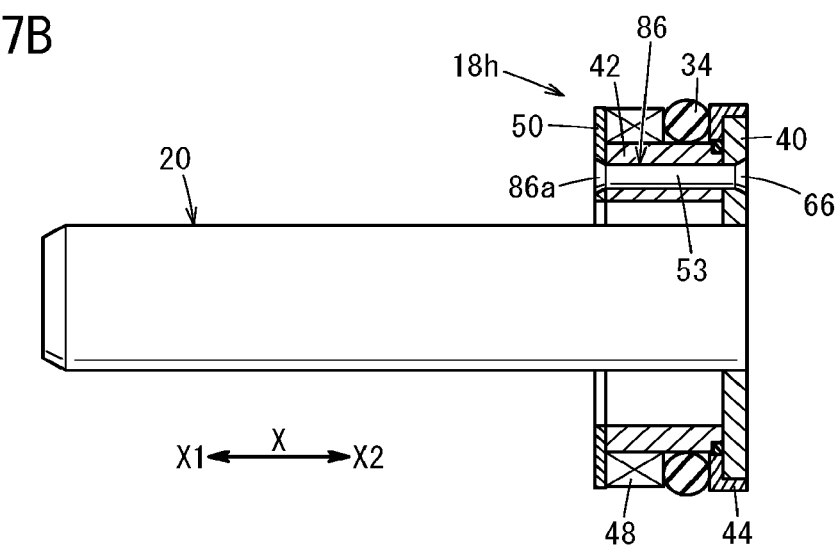

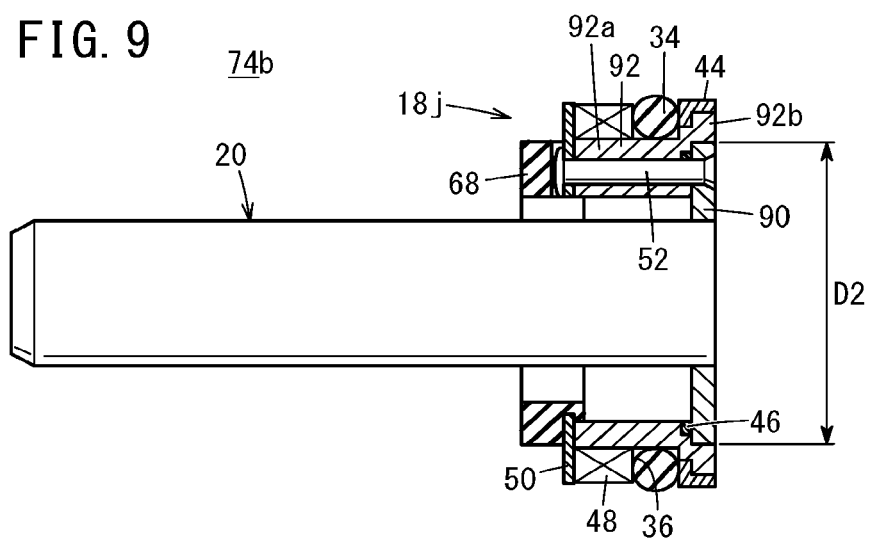

METHOD FOR PRODUCING PISTON ASSEMBLY AND HYDRAULIC FLUID DEVICE

TECHNICAL FIELD

The present invention relates to a fluid pressure device (hydraulic fluid device) provided with a piston and a method for producing a piston assembly.

BACKGROUND ART

Conventionally, various devices are known as fluid pressure devices provided with pistons. For example, fluid pressure cylinders including pistons displaced by the effect of supplied pressurized fluid are well known as means (actuators) for transporting workpieces and the like. A typical fluid pressure cylinder includes a cylinder tube, a piston disposed inside the cylinder tube so as to be movable in the axial direction, and a piston rod connected to the piston (for example, see Japanese Laid-Open Patent Publication No. 2003-120602). In such a fluid pressure cylinder, when pressurized fluid such as air is supplied into the cylinder tube, the piston is pushed by the pressurized fluid and displaced in the axial direction. This also causes the piston rod connected to the piston to be displaced in the axial direction.

SUMMARY OF INVENTION

The piston has, on an outer circumferential part thereof, a packing mounting groove in which a packing is mounted. In a conventional fluid pressure cylinder, the packing mounting groove is formed by grooving (cutting). Thus, during an assembly process, the packing needs to be pulled radially outward for an increase in diameter, in order to externally insert the packing around the piston. Such an attachment process is not easily automated using robots, and the productivity is difficult to increase.

The present invention has been devised taking into consideration the aforementioned problems, and has the object of providing a fluid pressure device and a method for producing a piston assembly allowing productivity to be increased.

To achieve the above-described object, a fluid pressure device of the present invention includes a body having a slide hole inside the body, a piston unit movable in an axial direction inside the slide hole, and a piston rod protruding from the piston unit in the axial direction, wherein the piston unit includes a packing and a piston body including a plurality of members, and the piston body including a packing mounting groove in which the packing is mounted, the plurality of members of the piston body include a first piston member protruding outward from the piston rod and a second piston member disposed adjoining the first piston member, the packing is disposed on an outer circumferential part of the second piston member, and a combination of at least two members of the plurality of members defines the packing mounting groove.

According to the fluid pressure device of the present invention adopting the above-described structure, the combination of the plurality of members defines the packing mounting groove. This leads to an increase in productivity, compared with a case where a groove in which the packing is mounted is formed by grooving (cutting). Moreover, the first piston member and the second piston member may be shaped by, for example, casting, and thus it is possible to reduce the amount of material to be used, compared with the case of adopting a grooving process. Therefore, the present invention is economical and can achieve resource savings. Moreover, the packing can be attached to the piston body without the need to increase the diameter of the packing in the assembly process of the piston unit. Consequently, the process of mounting the packing can be easily automated using robots, thereby leading to an increase in productivity.

In the above-described fluid pressure device, the plurality of members of the piston body may further include a fixing plate having an outer diameter larger than an outer diameter of the second piston member, the fixing plate being disposed adjoining the second piston member on a side of the second piston member that is remote from the first piston member, and the packing may be disposed between the first piston member and the fixing plate.

In the above-described fluid pressure device, the first piston member, the second piston member, and the fixing plate may be fastened together in the axial direction by a connecting pin.

In the above-described fluid pressure device, the plurality of members of the piston body may further include a wear ring made of a low friction material and disposed so as to surround an outer circumferential part of the first piston member and a magnet disposed adjoining the fixing plate, and an outer circumferential surface of the second piston member, an end surface of the wear ring, and an end surface of the magnet may define the packing mounting groove.

In the above-described fluid pressure device, a gasket may be disposed between the first piston member, the second piston member, and the wear ring.

In the above-described fluid pressure device, the fixing plate may be provided with a damper made of an elastic material.

In the above-described fluid pressure device, a cavity may be formed between the second piston member and the piston rod.

In the above-described fluid pressure device; a damper made of an elastic material may be disposed between an inner circumferential part of the second piston member and an outer circumferential part of the piston rod along an axial direction of the piston rod.

The above-described fluid pressure device may further include a cushioning mechanism configured to form a gas cushion to thereby decelerate the piston unit when the piston unit approaches a stroke end, wherein the cushioning mechanism may include a cushion ring joined to an outer circumferential surface of the piston rod.

In the above-described fluid pressure device, the first piston member may protrude outward from an end portion of the piston rod, and the second piston member may protrude in an axial direction away from the piston rod.

In the above-described fluid pressure device, an external size of the second piston member may be smaller than an external size of the first piston member.

In the above-described fluid pressure device, an external size of the second piston member may be larger than an external size of the first piston member.

The above-described fluid pressure device may be configured as a fluid pressure cylinder, a valve device, a length-measurement cylinder, a sliding table, or a chuck device.

A method for producing a piston assembly of the present invention, the piston assembly being provided with a piston unit including a packing mounted in a packing mounting groove and a piston rod protruding from the piston unit, includes the steps of providing a piston rod member including the piston rod and a first piston member protruding outward from the piston rod and stacking a plurality of members on the first piston member by relatively moving the packing and the plurality of members in an axial direction in sequence relative to the piston rod member, wherein the plurality of members constitute a piston body provided with the packing mounting groove, and a combination of at least two members of the plurality of members defines the packing mounting groove.

In the above-described method for producing the piston assembly, a distal end portion of the piston rod member may be directed upward in the step of stacking the plurality of members.

According to the fluid pressure device and the method for producing the piston assembly of the present invention, productivity can be easily increased.

The above-described object, features, and advantages will become more apparent from the following description of preferred embodiments in conjunction with the accompanying drawings.

BRIEF DESCRIPTION OF DRAWINGS

FIG. 2 is a perspective view of a piston assembly of the fluid pressure cylinder illustrated in FIG. 1;

FIG. 3A is a first diagram illustrating a method for producing the piston assembly, FIG. 3B is a second diagram illustrating the method for producing the piston assembly, FIG. 3C is a third diagram illustrating the method for producing the piston assembly, FIG. 3D is a fourth diagram illustrating the method for producing the piston assembly, FIG. 3E is a fifth diagram illustrating the method for producing the piston assembly, FIG. 3F is a sixth diagram illustrating the method for producing the piston assembly, FIG. 3G is a seventh diagram illustrating the method for producing the piston assembly, and FIG. 3H is an eighth diagram illustrating the method for producing the piston assembly;

FIG. 4A is a diagram illustrating a first example structure of a piston rod protruding toward both sides, and FIG. 4B is a diagram illustrating a second example structure of the piston rod protruding toward both sides;

FIG. 7A is a diagram illustrating a first example structure of the piston unit adopting connecting pins including flange portions formed at both ends, and FIG. 7B is a diagram illustrating a second example structure of the piston unit adopting connecting pins including crimped portions formed at both ends;

FIG. 9 is a diagram illustrating the piston unit including a second piston member having a diameter larger than the diameter of a first piston member;

DESCRIPTION OF EMBODIMENTS

Preferred embodiments of a fluid pressure cylinder and a method for producing a piston assembly according to the present invention will be described in detail below with reference to the accompanying drawings.

Figure 1:
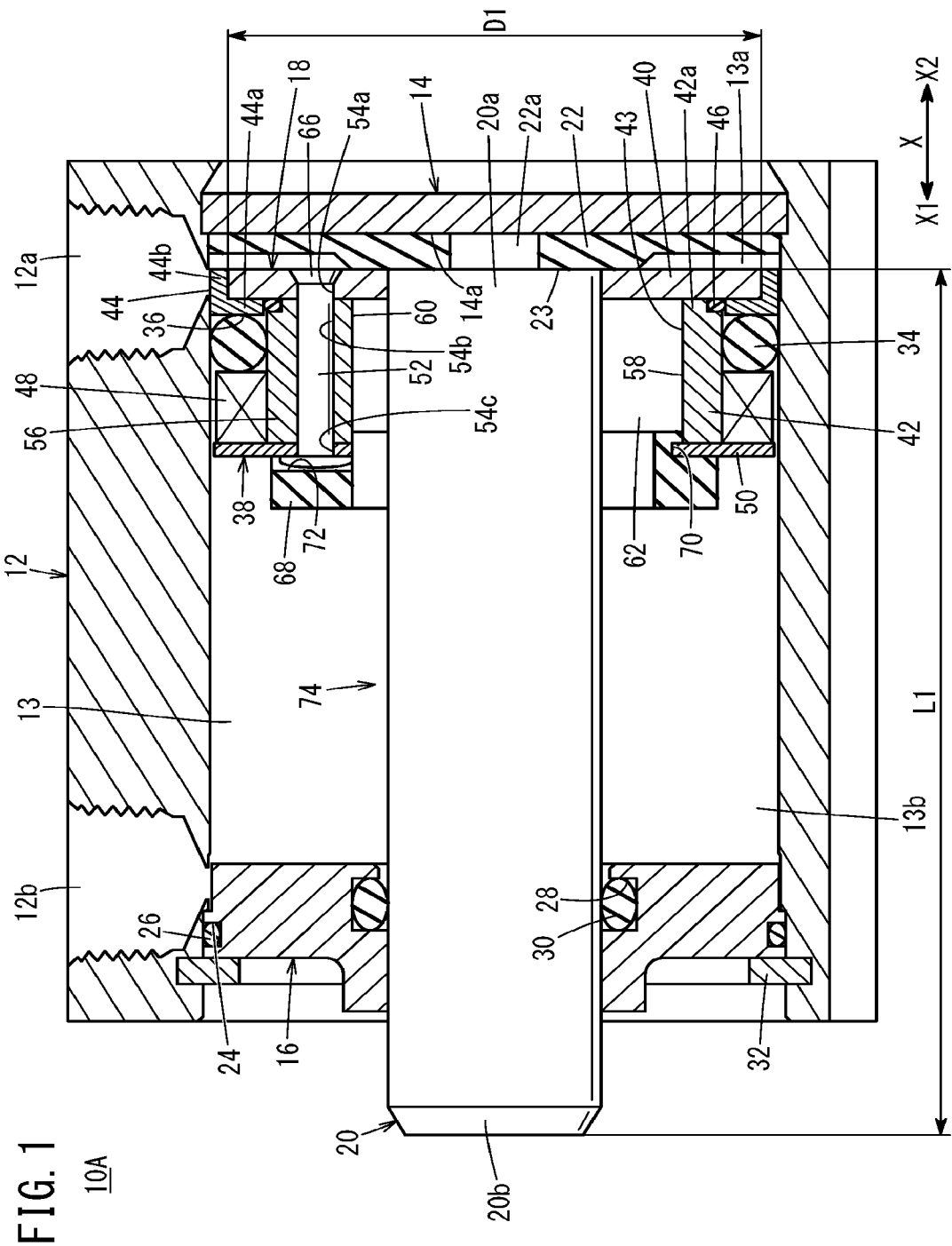
FIG. 1 is a cross-sectional view of a fluid pressure cylinder according to a first embodiment of the present invention.

A fluid pressure cylinder 10A, illustrated in FIG. 1 as an example of a fluid pressure device of the present invention, is provided with a cylinder tube 12 (body) having a hollow tubular shape, a head cover 14 disposed at one end portion of the cylinder tube 12, a rod cover 16 disposed at another end portion of the cylinder tube 12, a piston unit 18 disposed inside the cylinder tube 12 so as to be movable in the axial direction (direction of an arrow X), and a piston rod 20 connected to the piston unit 18. The fluid pressure cylinder 10A is used as an actuator for, for example, transporting a workpiece.

The cylinder tube 12 is a tubular structure composed of, for example, a metal material such as aluminum alloy extending in the axial direction. In this embodiment, the cylinder tube 12 has a hollow cylindrical shape. The cylinder tube 12 has a first port 12a disposed on one end side in the axial direction (end located in the direction of an arrow X2), a second port 12b disposed on another end side in the axial direction (end located in the direction of an arrow X1), and a slide hole 13 (cylinder chamber) communicating with the first port 12a and the second port 12b.

The head cover 14 is a plate-shaped structure composed of, for example, a metal material similar to the material of the cylinder tube 12 and closes the one end portion (end portion located in the direction of the arrow X2) of the cylinder tube 12. The head cover 14 hermetically closes the one end portion of the cylinder tube 12.

A first damper 22 is disposed on an inner wall surface 14a of the head cover 14. The first damper 22 is composed of, for example, an elastic material such as rubber or elastomer. The material of the first damper 22 includes, for example, urethane. In this embodiment, the first damper 22 has a ring shape with a through-hole 22a in a central part.

The first damper 22 is provided with an expanding portion 23 disposed on the central part of the first damper 22 and expanding toward the rod cover 16 (toward the piston rod 20 and the piston unit 18). In the first damper 22, the thickness of the expanding portion 23 is larger than the thickness of an outer peripheral part disposed radially outside the expanding portion 23. The expanding portion 23 can be brought into abutment with the piston rod 20 and the piston unit 18 when the piston rod 20 and the piston unit 18 are displaced toward the head cover 14.

The rod cover 16 is a circular ring-shaped member composed of, for example, a metal material similar to the material of the cylinder tube 12 and closes the other end portion (end portion located in the direction of the arrow X1) of the cylinder tube 12. An outer annular groove 24 is formed in an outer circumferential part of the rod cover 16. An outer sealing member 26 composed of an elastic material is mounted in the outer annular groove 24 in order to seal a gap between the outer circumferential surface of the rod cover 16 and the inner circumferential surface of the slide hole 13.

An inner annular groove 28 is formed in an inner circumferential part of the rod cover 16. An inner sealing member 30 composed of an elastic material is mounted in the inner annular groove 28 in order to seal a gap between the inner circumferential surface of the rod cover 16 and the outer circumferential surface of the piston rod 20. The rod cover 16 is locked by a stopper 32 secured to an inner circumferential part of the cylinder tube 12 on the other end side.

The piston unit 18 is accommodated inside the cylinder tube 12 (slide hole 13) so as to be slidable in the axial direction and partitions the interior of the slide hole 13 into a first pressure chamber 13a on the first port 12a side and a second pressure chamber 13b on the second port 12b side. In this embodiment, the piston unit 18 is connected to one end portion 20a (hereinafter referred to as "base end portion 20a") of the piston rod 20.

As illustrated in FIG. 1, the piston unit 18 includes a packing 34 and a piston body 38 provided with a packing mounting groove 36. As illustrated in FIGS. 1 and 2, the piston body 38 is provided with a first piston member 40, a second piston member 42, a wear ring 44 (supporting member), a gasket 46, a magnet 48, a fixing plate 50, and a plurality of connecting pins 52.

The first piston member 40 is a plate-shaped and ring-shaped member protruding radially outward from the base end portion 20a of the piston rod 20. The outer diameter of the first piston member 40 is larger than the outer diameter of the piston rod 20. The inner edge of the first piston member 40 is joined to the outer circumference of the base end portion 20a of the piston rod 20. The joining means for joining the first piston member 40 and the piston rod 20 includes, for example, welding and bonding.

A plurality of (three in this embodiment) pin holes 54a passing through the first piston member 40 in the thickness direction are formed in the first piston member 40. The plurality of pin holes 54a are disposed at regular intervals in the circumferential direction.

The material of the first piston member 40 includes, for example, metal materials such as carbon steel, stainless steel, and aluminum alloy and hard resin. In a case where the first piston member 40 and the piston rod 20 are joined by welding, the first piston member 40 is preferably composed of a metal material identical to the material of the piston rod 20 in order to ensure suitable bonding strength.

The second piston member 42 is a hollow cylindrical member with a rod insertion hole 43 formed therein, and is disposed adjoining the first piston member 40. The second piston member 42 includes a surrounding wall portion 56 surrounding the rod insertion hole 43. In this embodiment, the second piston member 42 is disposed adjoining a side of the first piston member 40 closer to a distal end portion 20b of the piston rod 20 so as to surround the piston rod 20. The outer diameter of the second piston member 42 is smaller than the outer diameter of the first piston member 40. The second piston member 42 is provided with a reduced-diameter portion 42a at one end portion, and the gasket 46 is disposed on the reduced-diameter portion 42a.

The same number of (three in this embodiment) pin insertion holes 54b as the plurality of pin holes 54a formed in the first piston member 40 are formed in the surrounding wall portion 56 of the second piston member 42. The pin insertion holes 54b pass through the surrounding wall portion 56 of the second piston member 42 in the axial direction (direction of the arrow X). As are the plurality of pin holes 54a, the plurality of pin insertion holes 54b are disposed at regular intervals in the circumferential direction.

The second piston member 42 has a plurality of concave portions 58 and a plurality of convex portions 60 which are arranged on the inner circumference. The concave portions 58 are concave radially outward and disposed at regular intervals in the circumferential direction. The convex portions 60 protrude radially inward and are disposed between concave portions 58. Each of the convex portions 60 has the corresponding pin insertion hole 54b described above. In this embodiment, top portions (inner ends) of the convex portions 60 are separate from the outer circumferential surface of the piston rod 20. The top portions (inner ends) of the convex portions 60 may be in abutment with the outer circumferential surface of the piston rod 20.

A cavity 62 (see FIG. 1) is formed between an inner circumferential part of the second piston member 42 and the outer circumferential surface of the piston rod 20. In this embodiment, the cavity 62 has an annular shape extending around the entire circumference of the piston rod 20. In a case where the top portions (inner ends) of the convex portions 60 are in abutment with the outer circumferential surface of the piston rod 20, a plurality of cavities 62 are formed at intervals in the circumferential direction of the piston rod 20. In this embodiment, the first piston member 40 and the second piston member 42 are formed by casting. The forming method of the first piston member 40 and the second piston member 42 is not limited to casting, and may be methods other than casting, for example, cutting.

The packing 34 is a ring-shaped sealing member (for example, O-ring) composed of an elastic body mounted on an outer circumferential part of the second piston member 42. The material of the packing 34 includes an elastic material such as rubber and elastomer. The outer diameter of the packing 34 is larger than the outer diameters of the wear ring 44 and the magnet 48 the packing 34 is in a natural state (i.e., when not disposed inside the slide hole 13 and not elastically compressed radially inward) and when the packing 34 is disposed inside the slide hole 13.

The outer circumference of the packing 34 airtightly or liquid-tightly contacts closely the inner circumferential surface of the slide hole 13 over the entire circumference. The inner circumference of the packing 34 air-tightly or liquid-tightly contacts closely the outer circumferential surface of the second piston member 42 over the entire circumference. The packing 34 is elastically compressed radially between the inner circumferential surface of the slide hole 13 and the outer circumferential surface of the second piston member 42. The packing 34 seals the gap between the outer circumferential surface of the piston unit 18 and the inner circumferential surface of the slide hole 13 and airtightly or liquid-tightly separates the first pressure chamber 13a and the second pressure chamber 13b from each other inside the slide hole 13.

The wear ring 44 is a member that prevents the outer circumferential surface of the first piston member 40 from coming into contact with the inner circumferential surface of the slide hole 13 when a large lateral load is applied to the piston unit 18 in directions perpendicular to the axial direction while the fluid pressure cylinder 10A is operating. The wear ring 44 is a circular ring-shaped member mounted on an outer circumference of the first piston member 40 so as to surround the outer circumference of the first piston member 40.

In this embodiment, the wear ring 44 includes a radial portion 44a and an axial portion 44b. The radial portion 44a extends radially and is in contact with an end surface (an end surface located in the direction of the arrow X1) of the first piston member 40. The axial portion 44b extends in the axial direction and is in abutment with the outer circumferential surface of the first piston member 40. The wear ring 44 (specifically, the radial portion 44a) is in abutment with one side part (a side part located in the direction of the arrow X2) of the packing 34. The inner diameter of the radial portion 44a is smaller than the outer diameter of the first piston member 40. The axial portion 44b extends from an outer end part of the radial portion 44a in the axial direction. The outer diameter of the wear ring 44 (outer diameter of the axial portion 44b) is larger than the outer diameters of the first piston member 40, the magnet 48, and the yoke.

The wear ring 44 is composed of a low friction material. The frictional coefficient between the wear ring 44 and the inner circumferential surface of the slide hole 13 is smaller than the frictional coefficient between the packing 34 and the inner circumferential surface of the slide hole 13. Such a low friction material includes, for example, synthetic resins with a low friction property and a high wear resistance such as polytetrafluoroethylene (PTFE) and metal materials (for example, bearing steel).

The gasket 46 is a circular ring-shaped member composed of an elastic body and is disposed among the first piston member 40, the second piston member 42, and the wear ring 44. The gasket 46 may be composed of a material similar to the material of the packing 34. The gasket 46 air-tightly or liquid-tightly contacts closely the first piston member 40, the second piston member 42, and the wear ring 44.

Specifically, the gasket 46 is in close contact with the end surface of the first piston member 40 facing the second piston member 42, the outer circumferential surface of the reduced-diameter portion 42a of the second piston member 42, and the inner circumferential surface of the wear ring 44 (inner circumferential surface of the radial portion 44a). The gasket 46 air-tightly or liquid-tightly seals the gap between the first piston member 40 and the second piston member 42, the gap between the first piston member 40 and the wear ring 44, and the gap between the second piston member 42 and the wear ring 44.

The magnet 48 is a circular ring-shaped member mourned on another outer circumferential part of the second piston member 42 so as to surround the outer circumferential part of the second piston member 42. The magnet 48 is disposed adjacent to the packing 34 on a side of the packing 34 remote from the wear ring 44 (a side located in the direction of the arrow X1) and is in abutment against another side part of the packing 34. The magnet 48 is, for example, a ferrite magnet, a rare earth magnet, or the like.

Magnetic sensors (not illustrated) are attached to the outer surface of the cylinder tube 12 at positions corresponding to both stroke ends of the piston unit 18. The magnetic sensors detect magnetism generated by the magnet 48 to thereby detect the working position of the piston unit 18.

The end surface (end surface located in the direction of the arrow X1) of the wear ring 44, the end surface (end surface located in the direction of the arrow X2) of the magnet 48, and the outer circumferential surface of the piston member 42 form the packing mounting groove 36 recessed radially inward and annularly extending in the circumferential direction. The packing 34 is mounted the packing mounting groove 36.

The fixing plate 50 is a circular ring-shaped member and holds the wear ring 44, the packing 34, and the magnet 48 in cooperation with the first piston member 40. In this embodiment, the fixing plate 50 surrounds the piston rod 20. Specifically, the fixing plate 50 is in abutment against the end surface (end surface located in the direction of the arrow X1) of the magnet 48 remote from the packing 34 and in abutment against the end surface (end surface located in the direction of the arrow X1) of the second piston member 42 remote from the first piston member 40.

The material of the fixing plate 50 includes, for example, metal materials such as carbon steel (rolled steel and the like), stainless steel, and aluminum alloy and hard resin. The fixing plate 50 may be composed of a magnetic material such as rolled steel to also function as a yoke.

The same number of (three in this embodiment) pin holes 54c as the plurality of pin insertion holes 54b formed in the second piston member 42 are formed in the fixing plate 50. The plurality of pin holes 54c pass through the fixing plate 50 in the thickness direction. The pin holes 54c are disposed at regular intervals in the circumferential direction, as in the case of the plurality of pin insertion holes 54b formed in the second piston member 42.

By using the plurality of connecting pins 52, the first piston member 40, the second piston member 42, and the fixing plate 50, which are arranged adjacent to each other in the axial direction, are fastened in the axial direction, whereby they are secured together and integrated with each other. The wear ring 44, the packing 34, and the magnet 48 described above are held between the first piston member 40 and the fixing plate 50. Each of the connecting pins 52 is inserted into the corresponding pin hole 54a formed in the first piston member 40, the corresponding pin insertion hole 54b formed in the second piston member 42, and the corresponding pin hole 54c formed in the fixing plate 50, and engages with the first piston member 40 and the fixing plate 50.

Each of the connecting pins 52 has a flange portion 64 having a diameter larger than the diameter of a shaft portion 53 of the connecting pin 52, at one end portion (an end portion located in the direction of the arrow X1) thereof. The outer diameter of the flange portion 64 is larger than the diameter of the pin hole 54c formed in the fixing plate 50. Thus, the flange portion 64 engages with the periphery of the pin hole 54c formed in the fixing plate 50. Each of the connecting pins 52 has a crimped portion 66 (see FIG. 1) having a diameter larger than the diameter of the shaft portion 53, at another end portion (an end portion located in the direction of the arrow X2) thereof.

The crimped portions 66 are formed by pressing the other end portions of the connecting pins 52 in the axial direction and thereby plastically deforming the other end portions. In this embodiment, the crimped portions 66 are tapered along the shape of the pin holes 54a, and engage with the pin holes 54a. The crimped portions 66 may have a plate shape perpendicularly protruding from the respective shaft portions 53 of the connecting pins 52, and may engage with the peripheries of the pin holes 54a formed in the first piston member 40.

A second damper 68 composed of an elastic member is attached to an end of the piston unit 18 remote from the head cover 14 (end located in the direction of the arrow X1). The second damper 68 may be composed of a material similar to the material of the first damper 22. The second damper 68 has a circular ring shape and is disposed so as to surround the piston rod 20. In this embodiment, the second damper 68 is attached to the fixing plate 50. The outer diameter of the second damper 68 is smaller than the outer diameter of the fixing plate 50.

The second damper 68 has a plurality of engaging grooves 70 recessed radially inward and which are disposed on the inner circumferential part of an end portion closer to the fixing plate 50. The plurality of engaging grooves 70 are disposed at intervals in the circumferential direction. The engaging grooves 70 engage with the inner edge portion of the fixing plate 50, whereby the fixing plate 50 supports the second damper 68. Moreover, a plurality of recessed cutouts 72 are formed in the end surface of the second damper 68 closer to the fixing plate 50 at intervals in the circumferential direction. Each of the cutouts 72 accommodates the corresponding flange portion 64 of the connecting pin 52 described above.

The fluid pressure cylinder 10A may exclude one of the first damper 22 and the second damper 68 or may exclude both of the first damper 22 and the second damper 68.

The piston rod 20 is a pillar-shaped (cylindrical) member extending in the axial direction of the slide hole 13. The first piston member 40 described above is joined to the base end portion 20a of the piston rod 20. The piston rod 20 passes through the rod cover 16. A distal end portion 20b, which is the opposite end of the base end portion 20a of the piston rod 20, is exposed to the outside of the slide hole 13. The piston unit 18 and the piston rod 20 constitute a piston assembly 74.

The material of the piston rod 20 includes, for example, the material of the first piston member 40 (such as carbon steel). The piston rod 20 may be composed of a material identical to or different from the material of the first piston member 40.

Next, a method of assembling the piston assembly 74 configured as above will be described.

First, the piston rod 20 to which the first piston member 40 is joined by welding or other appropriate method is prepared. Then, an assembly process (FIGS. 3A to 3H) is performed in which the second piston member 42, the wear ring 44, the gasket 46, the packing 34, the magnet 48, the fixing plate 50, the connecting pins 52, and the second damper 68 described above are moved in the axial direction on the piston rod 20 provided with the first piston member 40, whereby they are assembled together on the piston rod. Thus, the piston assembly 74 is obtained.

More specifically, in the assembly process, as illustrated in FIGS. 3A to 3C, first, the wear ring 44, the gasket 46, and the second piston member 42 are sequentially moved toward the base end portion 20a of the piston rod 20 such that the piston rod 20 is inserted into the wear ring 44, the gasket 46, and the second piston member 42. In this case, for example, as illustrated in FIGS. 3A to 3C, the piston rod 20 is held such that the distal end portion 20b of the piston rod 20 is directed upward, and the wear ring 44, the gasket 46, and the second piston member 42 are disposed and stacked on the first piston member 40.

As a result, the wear ring 44 is disposed on the outer circumference of the first piston member 40, the one end portion of the second piston member 42 is brought into abutment with the first piston member 40, and the gasket 46 is disposed between the first piston member 40, the second piston member 42, and the wear ring 44. At this moment, the circumferential phases of the plurality of pin holes 54a formed in the first piston member 40, the plurality of pin insertion holes 54b formed in the second piston member 42, and the plurality of pin holes 54c formed in the fixing plate 50 are matched with each other.

Next, as illustrated in FIGS. 3D and 3E, the packing 34 and the magnet 48 are sequentially mounted on the outer circumferential part of the second piston member 42. In this case, unlike a conventional assembly method of mounting a packing in an annular packing mounting groove, the packing 34 can be easily mounted in the outer circumferential part of the second piston member 42 without the need to pull the packing radially outward for an increase in diameter. In addition, in a conventional assembly method, a plurality of magnet pieces are joined together by bonding on the outer circumference of a piston to thereby constitute an annular magnet. In this embodiment, however, the annular magnet 48 can be assembled directly to the second piston member 42 on an as-is basis. Next, as illustrated in FIG. 3F, the fixing plate 50 is brought into contact with another end portion of the second piston member 42.

After the packing 34, the magnet 48, and the fixing plate 50 are stacked as described above, the plurality of connecting pins 52 are then inserted into the pin holes 54c provided for the fixing plate 50, the plurality of pin insertion holes 54b provided for the second piston member 42, and the plurality of pin holes 54a provided for the first piston member 40 as illustrated in FIG. 3G. The end portions of the connecting pins 52 protruding from the first piston member 40 are pressed and plastically deformed to thereby be increased in diameter. This creates the crimped portions 66 (see FIG. 1). As a result, the first piston member 40, the second piston member 42, and the fixing plate 50 are firmly fastened together in the axial direction with the plurality of connecting pins 52, and the packing 34 is mounted in the packing mounting groove 36 formed by the second piston member 42, the wear ring 44, and the magnet 48.

Next, as illustrated in FIG. 3H, the second damper 68 is attached to the fixing plate 50. In this case, since the second damper 68 is composed of an elastic member, which is easily deformed, by pressing the second damper 68 against the fixing plate 50, the engaging grooves 70 (see FIG. 1) of the second damper 68 can easily engage with the inner edge portion of the fixing plate 50. Thus, the second damper 68 can be easily attached to the fixing plate 50.

In this manner, assembling of the piston assembly 74 is completed.

Next, the effects and advantages of the above-configured fluid pressure cylinder 10A illustrated in FIG. 1 will be described. In the fluid pressure cylinder 10A, the piston unit 18 is moved inside the slide hole 13 in the axial direction by action of pressurized fluid (for example, compressed air) introduced via the first port 12a or the second port 12b. This causes the piston rod 20 connected to the piston unit 18 to reciprocate.

Specifically, in order to displace (advance) the piston unit 18 toward the rod cover 16, the pressurized fluid is supplied from a pressurized fluid supply source (not illustrated) to the first pressure chamber 13a via the first port 12a while the second port 12b is open to the atmosphere. As a result, the pressurized fluid pushes the piston unit 18 toward the rod cover 16. Then, the piston unit 18 is displaced (advanced) toward the rod cover 16 together with the piston rod 20. When the second damper 68 comes into contact with the end surface of the rod cover 16, the advancing motion of the piston unit 18 is stopped. In this case, the second damper 68 composed of an elastic material prevents the piston unit 18 and the rod cover 16 from coming into direct contact with each other. Thus, impact and impact noise occurring when the piston unit 18 reaches the advanced position (stroke end on the rod cover 16 side) are effectively prevented or reduced.

On the other hand, in order to displace (retract) the piston unit 18 toward the head cover 14, the pressurized fluid is supplied from the pressurized fluid supply source (not illustrated) to the second pressure chamber 13b via the second port 12b while the first port 12a is open to the atmosphere. As a result, the pressurized fluid pushes the piston unit 18 toward the head cover 14. Thus, the piston unit 18 is displaced toward the head cover 14. When the piston rod 20 and the first piston member 40 come into contact with the first damper 22 (expanding portion 23), the retracting motion of the piston unit 18 is stopped. In this case, the first damper 22 composed of an elastic material prevents the piston unit 18 and the head cover 14 from coming into direct contact with each other. Thus, impact and impact noise occurring when the piston unit 18 reaches the retracted position (stroke end on the head cover 14 side) are effectively prevented or reduced.

The fluid pressure cylinder 10A has the packing mounting groove 36 formed by a combination of the plurality of members (the second piston member 42, the wear ring 44, and the magnet 48). This leads to an increase in productivity, compared with a case where a groove in which the packing 34 is mounted is formed by grooving (cutting). Moreover, the first piston member 40 and the second piston member 42 are shaped by casting. Thus it is possible to reduce the amount of material used for the fluid pressure cylinder, compared with the case of adopting a grooving process. Therefore, the present invention is economical and can achieve resource savings.

For installing the packing 34 into a groove formed by grooving, the packing 34 needs to be elastically deformed such that the diameter is increased compared with the diameter of the groove, before being mounted. Thus, it is difficult to automate (integrate into an automatic assembly process performed by robots) the process of mounting the packing 34 into the groove formed by such grooving. In contrast, the piston unit 18 has the packing mounting groove 36 formed by a combination of the plurality of members or components, and the packing 34 can be mounted on the piston body 38 without the need to increase the diameter of the packing 34 in the assembly process. Consequently, the process of mounting the packing can be easily automated using robots.

Moreover, as described above, the members other than the packing 34 can also be assembled to the piston rod 20 by moving the members in the axial direction relative to the piston rod 20 with the first piston member 40 mounted thereon and stacking them together. Consequently, the process of assembling the piston unit 18 (piston assembly 74) can be easily automated, leading to an increase in productivity.

Furthermore, in this embodiment, the inner circumference of the second piston member 42 is separate from the outer circumferential surface of the piston rod 20, and the cavity 62 is formed between the second piston member 42 and the piston rod 20. Thus, the weight of the piston unit 18 can be reduced through the reduction in weight of the second piston member 42. The reduction in weight of the piston unit 18 leads to a reduction in consumption of the pressurized fluid, and thus to energy savings.

The fluid pressure cylinder 10A described above adopts the piston rod 20 protruding toward only one side of the piston unit 18. However, as illustrated in FIGS. 4A to 4B, the fluid pressure cylinder 10A may adopt piston rods 21, 21a protruding toward both sides of the piston unit 18.

The piston rod 21 illustrated in FIG. 4A has a solid structure, and the piston rod 21a illustrated in FIG. 4B has a hollow structure. In these cases, the piston unit 18 may be joined to the outer circumferential surface of the piston rod 21, 21a by welding or bonding. The piston rods 21 and 21a may each include a first rod portion and a second rod portion connected in the axial direction. In this case, the first rod portion and the second rod portion may be connected by screw-engagement (screwing), welding, bonding, or the like.

In addition to the structures described above, the piston unit 18 may adopt various structures, such as piston units 18a to 18j respectively illustrated in FIGS. 5A to 9. In the above-described structures also, the piston units 18a to 18j each with the packing 34 mounted thereon can be assembled by stacking the plurality of components or members in the axial direction. The piston units 18a to 18j may also be adopted in fluid pressure cylinders 10B to 10F according to second to sixth embodiments described below.

Figure 5A:
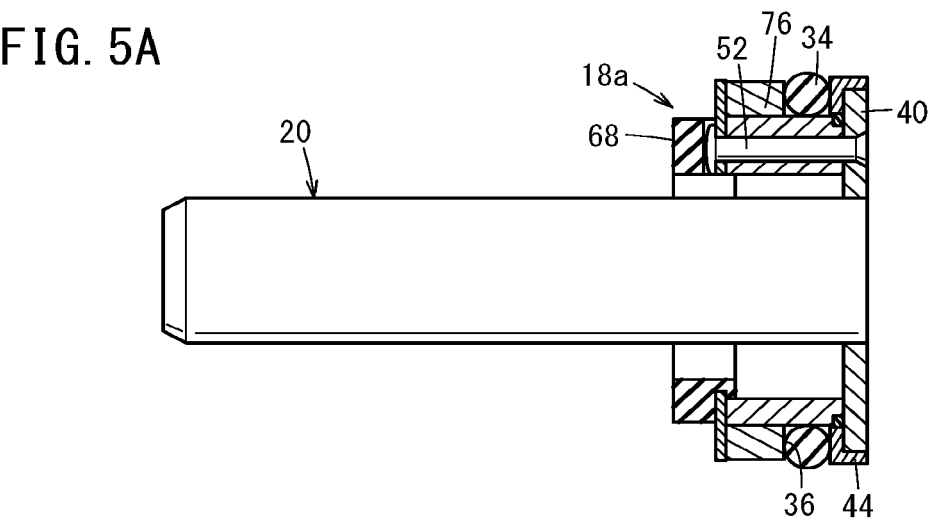
FIG. 5A is a diagram illustrating a piston unit including a spacer instead of a magnet.

In the piston unit 18a illustrated in FIG. 5A, a spacer 76 is disposed adjoining the packing 34, instead of the magnet 48 (see FIG. 1). Thus, the second piston member 42, the wear ring 44, and the spacer 76 jointly form the packing mounting groove 36 in the piston unit 18a. In the case illustrated in FIG. 5A, the spacer 76 has a quadrangular cross-section.

Figure 5B:
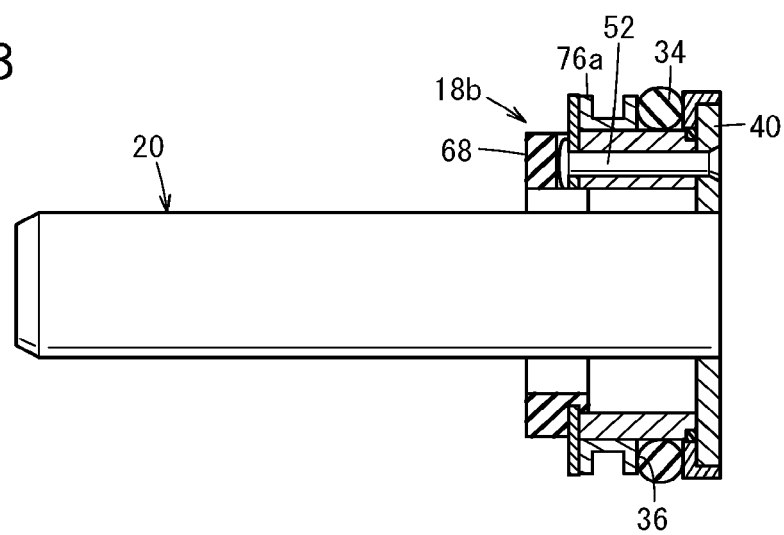
FIG. 5B is a diagram illustrating the piston unit including another spacer instead of the magnet.

In the piston unit 18b illustrated in FIG. 5B, a spacer 76a having a different shape is disposed adjoining the packing 34. Thus, the second piston member 42, the wear ring 44, and the spacer 76a jointly form the packing mounting groove 36 in the piston unit 18b. In the case illustrated in FIG. 5B, the spacer 76a has a square U-shaped cross-section. The piston units 18a, 18b respectively illustrated in FIGS. 5A and 5B do not require a yoke. Thus, the fixing plate 50 may be composed of a non-magnetic body.

Figure 5C:
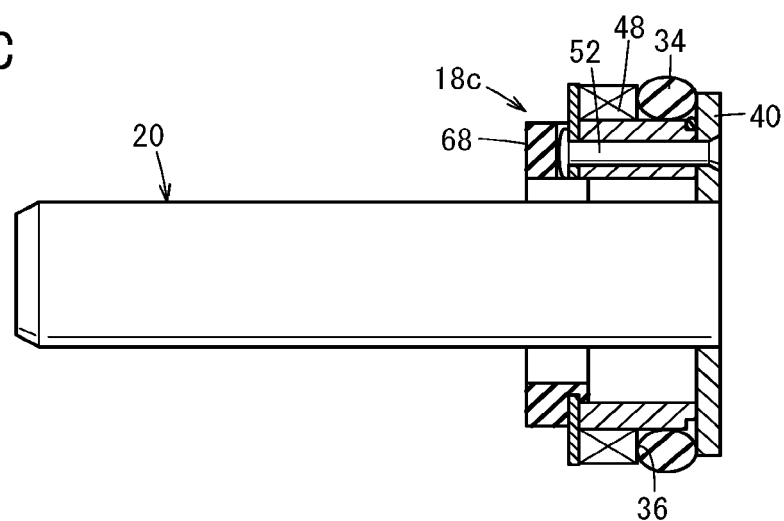
FIG. 5C is a diagram illustrating the piston unit from which a wear ring is omitted.

In the piston unit 18c illustrated in FIG. 5C, the wear ring 44 (see FIG. 1) is omitted. Thus, the first piston member 40, the second piston member 42, and the magnet 48 form the packing mounting groove 36 in the piston unit 18c. Consequently, the packing 34 is disposed adjacent to the first piston member 40 and held between the first piston member 40 and the magnet 48.

Figure 6A:
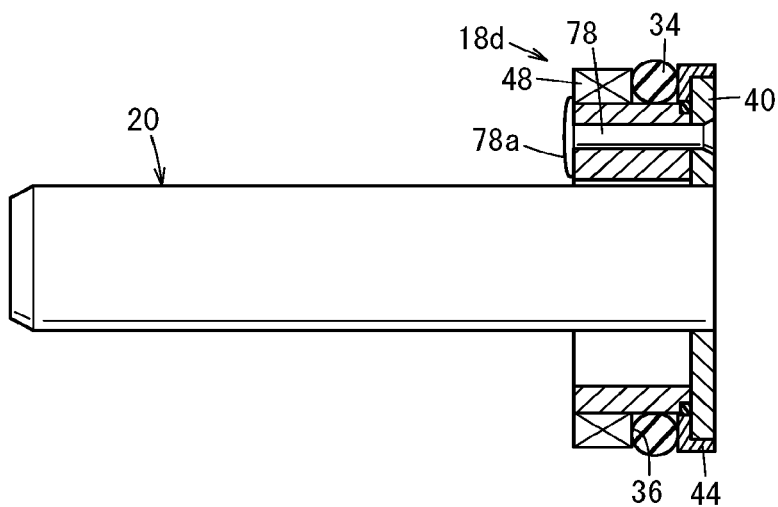
FIG. 6A is a diagram illustrating a first example structure of the piston unit from which a fixing plate is omitted.
Figure 6B:
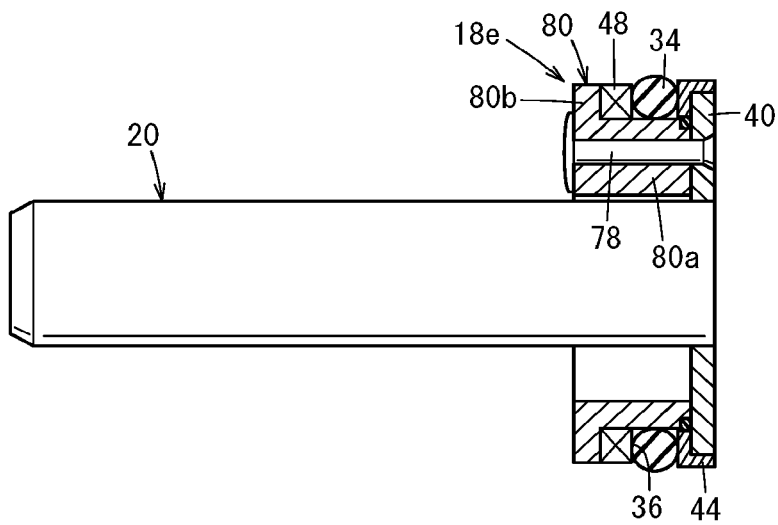
FIG. 6B is a diagram illustrating a second example structure of the piston unit from which the fixing plate is omitted.
Figure 6C:
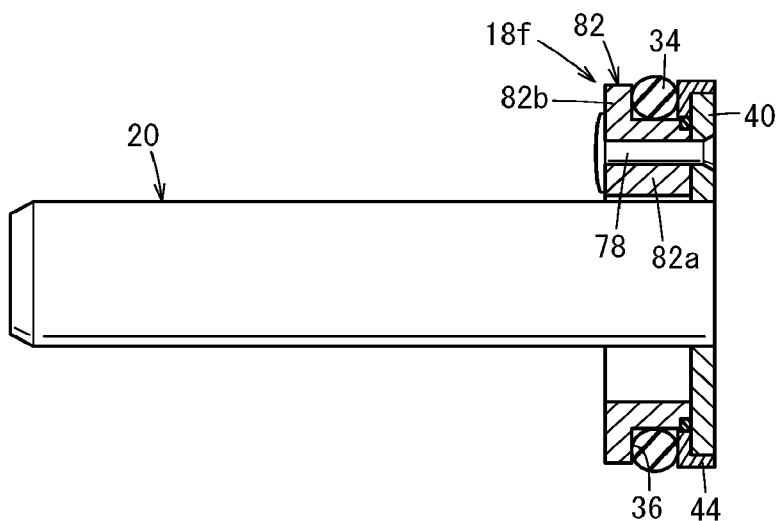
FIG. 6C is a diagram illustrating a third example structure of the piston unit from which the fixing plate is omitted.

In the piston units 18d to 18f respectively illustrated in FIGS. 6A to 6C, the fixing plate 50 (see FIG. 1) functioning as a yoke is omitted. In the piston unit 18d illustrated in FIG. 6A, a flange portion 78a of each connecting pin 78 has a diameter larger than the diameter of the flange portion 64 of the connecting pin 52 described above (see FIG. 2) and the outer diameter of the second piston member 42. Thus, the flange portion 78a is in abutment (engagement) with the end surface of the magnet 48 remote from the packing 34. Thus, the flange portion 78a prevents the magnet 48 from dropping off the second piston member 42. That is, in the piston unit 18d, the flange portions 78a of the connecting pins 78 function as the fixing plate holding the magnet 48.

In the piston unit 18e illustrated in FIG. 6B, a second piston member 80 includes a base portion 80a and a flange portion 80b protruding radially outward from the base portion 80a. The packing 34 and the magnet 48 are disposed on an outer circumferential part of the base portion 80a. The flange portion 80b is in abutment with the end surface of the magnet 48 remote from the packing 34. Thus, the flange portion 80b prevents the magnet 48 from dropping off the second piston member 80. That is, in the piston unit 18e, the flange portion 80b of the second piston member 80 functions as the fixing plate holding the magnet 48.

In the piston unit 18f illustrated in FIG. 6C, the magnet 48 and the fixing plate 50 are omitted. A second piston member 82 includes a base portion 82a and a flange portion 82b protruding radially outward from the base portion 82a. The packing 34 is disposed on an outer circumferential part of the base portion 82a. The flange portion 82b is in abutment with the packing 34. Thus, the first piston member 40 and the second piston member 82 jointly form the packing mounting groove 36 in the piston unit 18f. The packing 34 is held between the first piston member 40 and the flange portion 82b.

In the piston unit 18g illustrated in FIG. 7A, each connecting pin 84 includes a plate-shaped flange portion 84a protruding perpendicularly to the corresponding shaft portion 53 at an end (end located in the direction of the arrow X2) of the connecting pin 84 adjacent to the first piston member 40. That is, the connecting pins 84 include the flange portions 84a, instead of the crimped portions 66 (see FIG. 1) in the above-described connecting pins 52, and have a structure similar to the structure of the connecting pins 52 except for the flange portions 84a.

In the piston unit 18h illustrated in FIG. 7B, each connecting pin 86 includes a tapered crimped portion 86a having a diameter larger than the diameter of the shaft portion 53 at an end located in the direction of the arrow X1 of the connecting pin 86. That is, each connecting pin 86 includes the crimped portion 86a, instead of the flange portion 64 (see FIG. 2) in the above-described connecting pin 52, and has a structure similar to the structure of the connecting pin 52 except for the crimped portion 86a.

Figure 8:
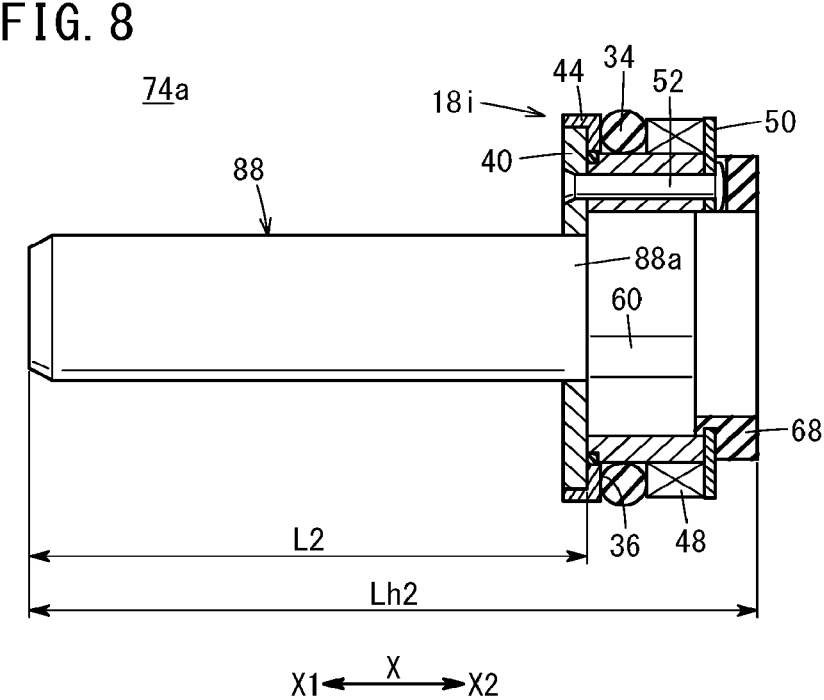
FIG. 8 is a diagram illustrating the piston unit disposed to protrude rearward from the piston rod.

The piston unit 18i illustrated in FIG. 8 is connected to an end portion 88a of a piston rod 88 so as to protrude from the piston rod 88 in the axial direction (direction of the arrow X2). Specifically, the piston unit 18i is disposed in a direction opposite to the direction of the piston unit 18 illustrated in FIG. 1 with respect to the axial direction. Consequently, the components of the piston unit 18i are identical to the components of the piston unit 18 illustrated in FIG. 1.

The total length Lh2 of a piston assembly 74a including the piston rod 88 and the piston unit 18i illustrated in FIG. 8 is identical to the total length (identical to the length L1 of the piston rod 20) of the piston assembly 74 illustrated in FIG. 1. On the other hand, the length L2 of the piston rod 88 illustrated in FIG. 8 is shorter than the length L1 of the piston rod 20 illustrated in FIG. 1.

In this manner, according to the piston assembly 74a illustrated in FIG. 8, the length L2 of the piston rod 88 can be reduced, compared with the piston assembly 74 illustrated in FIG. 1. Consequently, the weight of the piston rod 88 serving as a moving part can be reduced, thereby leading to a reduction in consumption of the pressurized fluid and thus to energy savings.

In the piston unit 18j illustrated in FIG. 9, the outer diameter (planar size) of a second piston member 92 is larger than the outer diameter (planar size) of a first piston member 90. Specifically, the outer diameter D2 of the first piston member 90 is smaller than the outer diameter D1 of the first piston member 40 illustrated in FIG. 1. The second piston member 92 includes a base portion 92a and an annular large-diameter portion 92b. The packing 34 and the magnet 48 are disposed on the outer circumference of the base portion 92a. The outer diameter of the large-diameter portion 92b is larger than the outer diameter of the base portion 92a. The large-diameter portion 92b surrounds the first piston member 90. The wear ring 44 is disposed on the outer circumference of the large-diameter portion 92b.

In the piston unit 18j configured as above, the packing mounting groove 36 is formed by a combination of a plurality of members (the second piston member 92, the wear ring 44, and the magnet 48) as in the case where the piston unit 18 illustrated in FIG. 1 is adopted. This leads to an increase in productivity as in the case where the piston unit 18 illustrated in FIG. 1 is adopted, and also enables easy assembly of a piston assembly 74b including the piston unit 18j by stacking the plurality of members in the axial direction. Consequently, the process of assembling the piston assembly 74b including the piston unit 18j can be easily automated.

The piston rod 20 and the first piston member 40 illustrated in FIG. 1 are produced as separate parts, and joined together by, for example, welding. Instead of the above-described structure, a piston rod member 94 illustrated in FIG. 10A or a piston rod member 94a illustrated in FIG. 10B may also be adopted. The piston rod member 94 includes the piston rod 20 and the first piston member 40 integrated with each other. The piston rod member 94a includes a piston rod 21b and the first piston member 40 integrated with each other. The piston rod members 94 and 94a may be shaped by forging or casting.

Figure 10A:
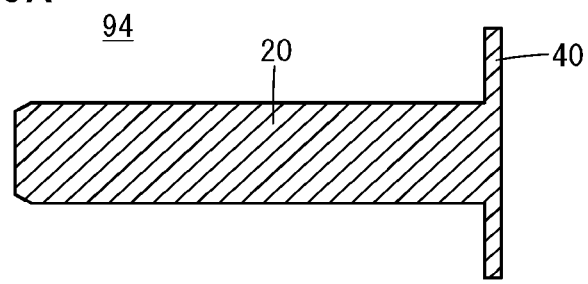
FIG. 10A is a diagram illustrating a first example structure of a piston rod member including the piston rod and the first piston member integrated with each other.
Figure 10B:
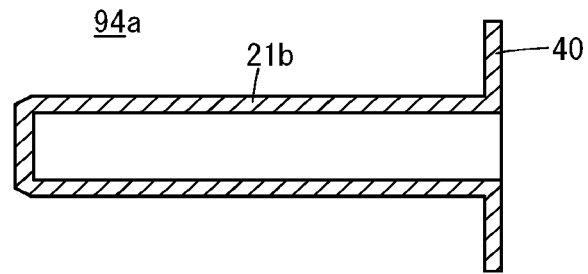
FIG. 10B is a diagram illustrating a second example structure of the piston rod member including the piston rod and the first piston member integrated with each other.

Specifically, the piston rod member 94 illustrated in FIG. 10A includes the piston rod 20 having a solid structure and the first piston member 40 continuous to an end of the piston rod 20 and protruding radially outward from the end. The piston rod member 94a illustrated in FIG. 10B includes the piston rod 21b having a hollow structure and the first piston member 40 continuous to an end of the piston rod 21b and protruding radially outward from the end.

Next, the fluid pressure cylinders 10B to 10F respectively according to the second to sixth embodiments will be described.

Figure 11:
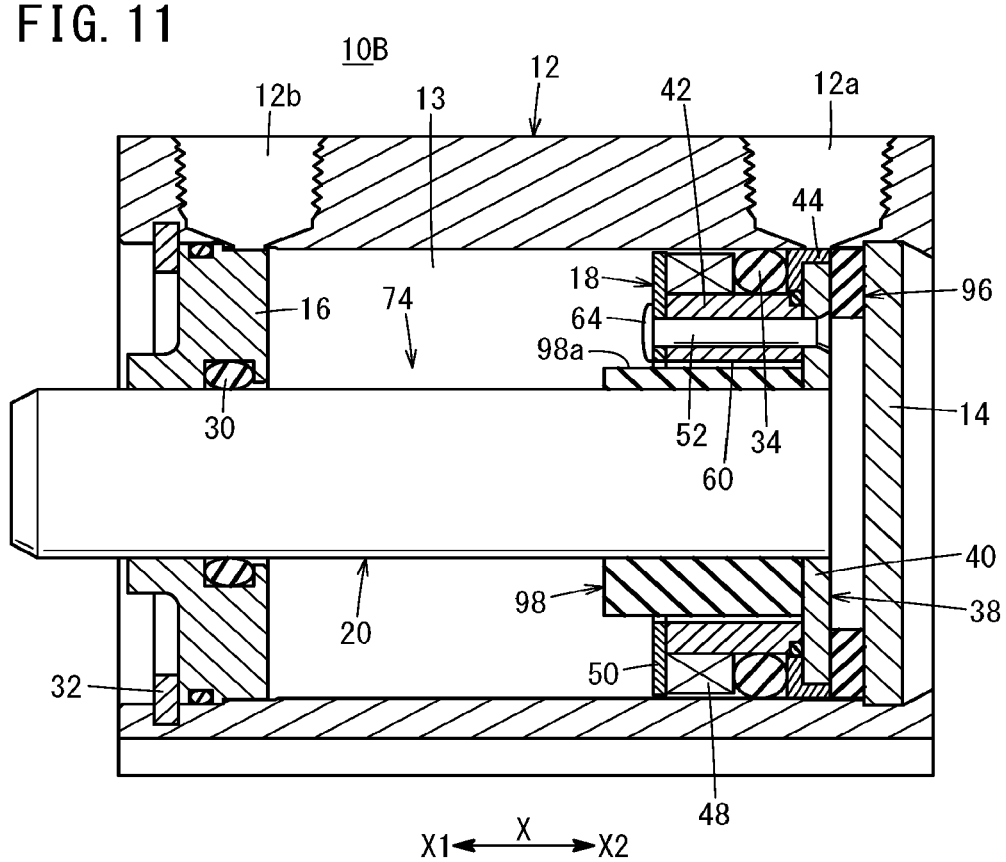
FIG. 11 is a cross-sectional view of a fluid pressure cylinder according to a second embodiment of the present invention.

Instead of the first damper 22 and the second damper 68 in the fluid pressure cylinder 10A illustrated in FIG. 1, the fluid pressure cylinder 10B according to the second embodiment illustrated in FIG. 11 adopts a first damper 96 and a second damper 98 having structures different from the structures of the first damper 22 and the second damper 68. As are the first damper 22 and the second damper 68, the first damper 96 and the second damper 98 are composed of an elastic material such as rubber. The structure of the fluid pressure cylinder 10B other than the first damper 96 and the second damper 98 is identical to the structure of the fluid pressure cylinder 10A.

The first damper 96 prevents or reduces impact and impact noise by abutment against the piston unit 18 when the piston unit 18 moves in the direction of the arrow X2 and then reaches the retracted position. The first damper 96 has a ring shape and is attached to the inner wall surface 14a of the head cover 14.

The inner diameter of the first damper 96 is larger than the outer diameter of the piston rod 20. The outer diameter of the first damper 96 is substantially identical to the outer diameter of the piston unit 18. Thus, the first damper 96 has a larger effective volume compared with the first damper 22 illustrated in FIG. 1. Consequently, the first damper 96 more effectively prevents or reduces impact and impact noise occurring when the piston unit 18 reaches the retracted position.

The second damper 98 prevents or reduces impact and impact noise by abutment against the rod cover 16 when the piston unit 18 moves in the direction of the arrow X1 and reaches the advanced position. The second damper 98 has a ring shape surrounding the piston rod 20 and is disposed between an outer circumferential part of the piston rod 20 and the inner circumference of the second piston member 42 along the axial direction of the piston rod 20. The inner circumference of the second damper 98 is in contact with the outer circumferential part of the piston rod 20, and the second damper 98 is supported by the piston rod 20.

The inner diameter of the second damper 98 before the piston rod 20 is inserted (before assembly) is smaller than the outer diameter of the piston rod 20. Thus, the second damper 98 in the assembled state is pressed against and in contact with the outer circumferential part of the piston rod 20 by the elastic restoring force of the second damper 98.

While an end (end located in the direction of the arrow X2) of the second damper 98 adjacent to the head cover 14 is in abutment with the first piston member 40, another end (end located in the direction of the arrow X1) of the second damper 98 adjacent to the rod cover 16 protrudes toward the rod cover 16 beyond the piston body 38 (specifically, the flange portions 64 of the connecting pins 52). Incidentally, during operation of the fluid pressure cylinder 10B (while the piston unit 18 is reciprocating), the second damper 98 may be separate from the first piston member 40.

An appropriate gap is formed between an outer circumferential part of the second damper 98 and the inner circumference of the second piston member 42. Thus, when the second damper 98 receives an axial compressive load, the second damper 98 increases in the outer diameter and is shortened in the axial direction. This enables the second damper 98 to demonstrate the shock absorbing ability without any problems.

Moreover, compared with the second damper 68 illustrated in FIG. 1, the second damper 98 has a smaller outer diameter but a longer axial length. Thus, the second damper 98 can secure a larger effective volume for enhancing the shock absorbing ability. Consequently, the second damper 98 more effectively prevents or reduces impact and impact noise occurring when the piston unit 18 reaches the advanced position.

Furthermore, the outer circumferential part of the second damper 98 has a shape formed along the shape of the inner circumference of the second piston member 42. That is, the outer circumferential part of the second damper 98 has an undulated shape including a plurality of concave portions 98a in which the plurality of convex portions 60 (see also FIG. 2) of the second piston member 42 are inserted. This structure enables the second damper 98 to secure as much volume as possible and the shock absorbing ability to be further enhanced.

Figure 12:
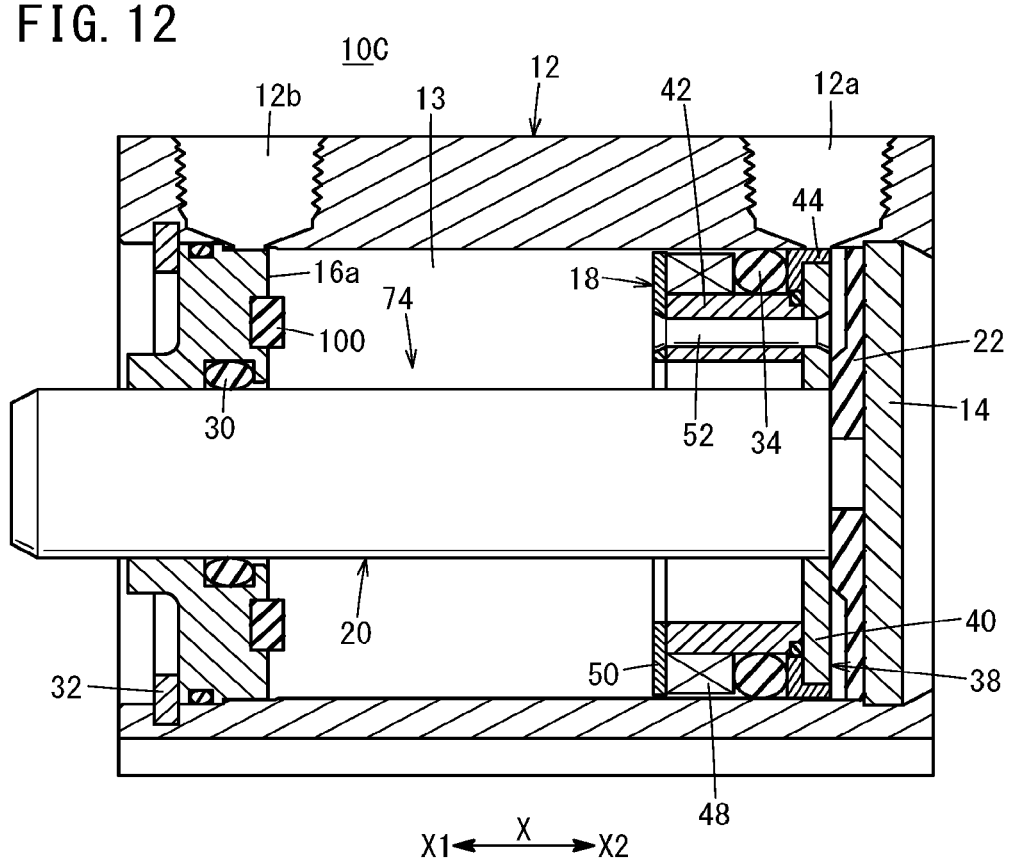
FIG. 12 is a cross-sectional view of a fluid pressure cylinder according to a third embodiment of the present invention.

The fluid pressure cylinder 10C according to the third embodiment illustrated in FIG. 12 has a second damper 100 on a surface 16a of the rod cover 16 facing the piston unit 18, instead of the second damper 68 provided on the piston unit 18 in the fluid pressure cylinder 10A illustrated in FIG. 1. The second damper 100 prevents or reduces impact and impact noise by coming into contact with the piston unit 18 when the piston unit 18 moves in the direction of the arrow X1 and then reaches the advanced position. The structure of the fluid pressure cylinder 10C other than the second damper is identical to the structure of the fluid pressure cylinder 10A.

Figure 13:
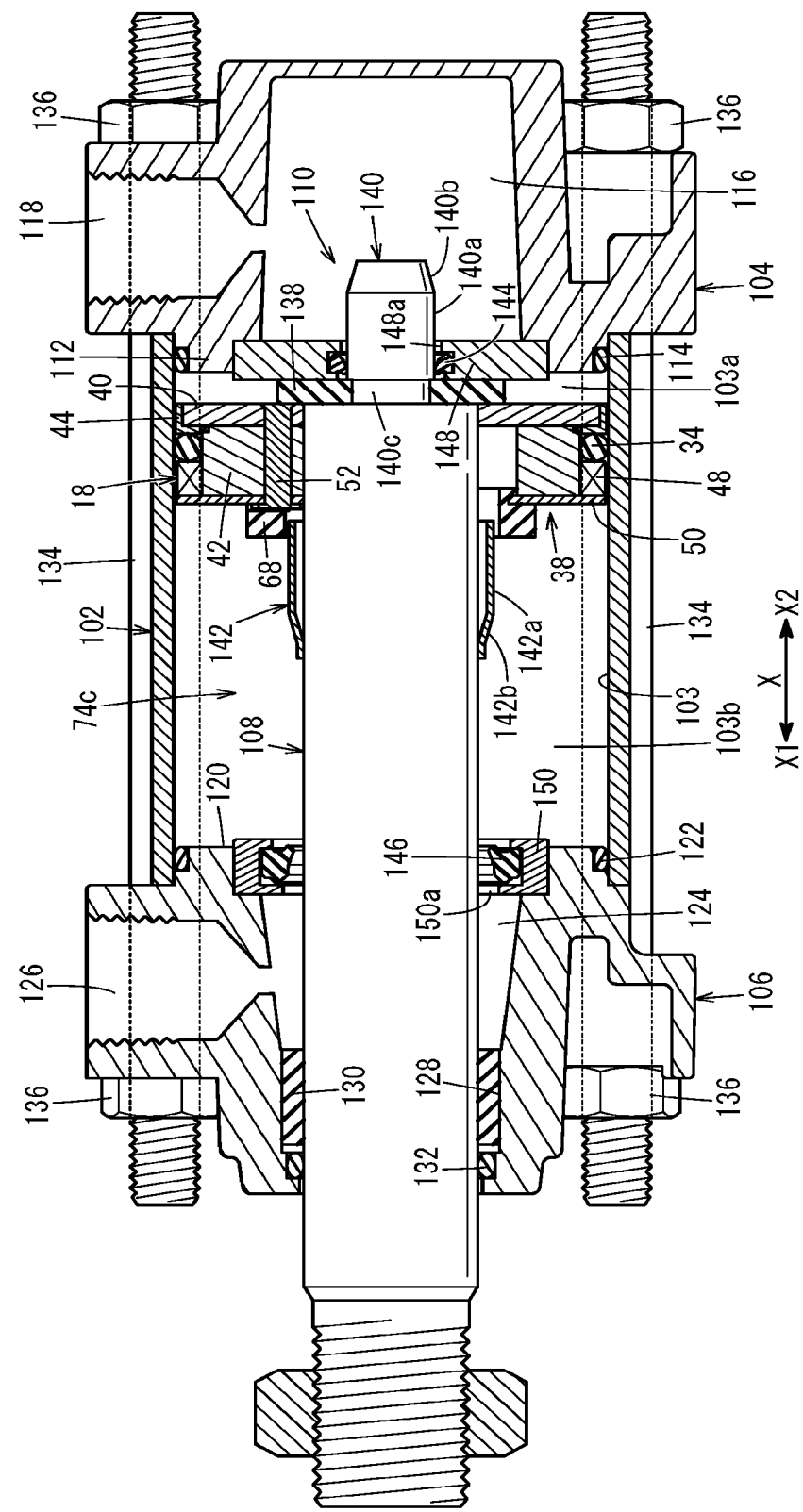
FIG. 13 is a cross-sectional view of a fluid pressure cylinder according to a fourth embodiment of the present invention.

The fluid pressure cylinder 10D according to the fourth embodiment illustrated in FIG. 13 is provided with a cylinder tube 102 (body) having a hollow cylindrical shape, a head cover 104 disposed at one end portion of the cylinder tube 102, and a rod cover 106 disposed at another end portion of the cylinder tube 102. The fluid pressure cylinder 10D is further provided with the piston unit 18 disposed inside the cylinder tube 102 so as to be movable in the axial direction (direction of the arrow X), a piston rod 108 connected to the piston unit 18, and a cushioning mechanism 110 relieving impact at one stroke end and the other stroke end of the piston unit 18.

The cylinder tube 102 has a cylindrical shape. A slide hole 103 (cylinder chamber) accommodating the piston unit 18 and which is closed by the head cover 104 and the rod cover 106, is formed inside the cylinder tube 102.

The head cover 104 includes a ring-shaped first stepped portion 112 protruding in the direction of the arrow X1, and the first stepped portion 112 is inserted into an end portion of the cylinder tube 102 located in the direction of the arrow X2. A gasket 114 is interposed between the outer circumference of the first stepped portion 112 and the cylinder tube 102. A first central hollow portion 116 and a first port 118 communicating with the first central hollow portion 116 are formed in the head cover 104. Pressurized fluid is supplied and discharged via the first port 118.

The rod cover 106 includes a ring-shaped second stepped portion 120 protruding in the direction of the arrow X2, and the second stepped portion 120 is inserted into an end portion of the cylinder tube 102 located in the direction of the arrow X1. A gasket 122 is interposed between the outer circumference of the second stepped portion 120 and the cylinder tube 102. A second central hollow portion 124 and a second port 126 communicating with the second central hollow portion 124 are formed in the rod cover 106. Pressurized fluid is supplied and discharged via the second port 126.

A rod hole 128 is formed in the second central hollow portion 124 at an inner circumferential part of the rod cover 106 located in the direction of the arrow X1. A ring-shaped bush 130 guiding the piston rod 108 in the axial direction is disposed inside the rod hole 128. In addition, inside the rod hole 128, a packing 132 is disposed adjoining a side of the bush 130 located in the direction of the arrow X1. The packing 132 hermetically contacts the outer circumferential surface of the piston rod 108.

The cylinder tube 102, the head cover 104, and the rod cover 106 described above are fastened together in the axial direction by a plurality of connecting rods 134 and nuts 136. Thus, the cylinder tube 102 is secured while being supported and sandwiched between the head cover 104 and the rod cover 106.

The piston unit 18 is configured in a manner similar to the piston unit 18 in the first embodiment. The second damper 68 is disposed on an end of the piston unit 18 closer to the rod cover 106. A first damper 138 is disposed on an end of the piston unit 18 adjacent to the head cover 104. Details of the first damper 138 will be described later.

The cushioning mechanism 110 includes a first cushioning member 140 and a second cushioning member 142 (cushion ring) provided on a movable part (piston rod 108), and also includes a ring-shaped first cushion seal 144 and a ring-shaped second cushion seal 146 composed of elastic members and provided on the fixed part (the head cover 104 and the rod cover 106).

The first cushioning member 140 is disposed at an end of the piston rod 108 located in the direction of the arrow X2 to be coaxial with the piston rod 108. Specifically, the first cushioning member 140 has a diameter smaller than the diameter of the piston rod 108 and protrudes from an end surface of the piston rod 108 in the direction of the arrow X2. The first cushioning member 140 has a hollow or solid cylindrical shape. The outer diameter of the first cushioning member 140 may be identical to or larger than the outer diameter of the piston rod 108.

The first cushioning member 140 may be a part integrated with the piston rod 108 or may be a separate part joined to the piston rod 108. In the case where the first cushioning member 140 is a part separate from the piston rod 108, the first cushioning member 140 may be joined to the piston rod 108 by joining means such as welding, bonding, and screwing.

The first cushioning member 140 includes a straight portion 140a and a tapered portion 140b on the outer circumference of the first cushioning member 140. The straight portion 140a has a fixed outer diameter in the axial direction. The tapered portion 140b is disposed adjoining an end of the straight portion 140a remote from the piston rod 108 (a side located in the direction of the arrow X2) and has a diameter gradually reducing in a direction away from the piston rod 108. The tapered portion 140b is an outer circumferential part of a free end portion of the first cushioning member 140.

A reduced-diameter portion 140c with a diameter smaller than the diameter of the straight portion 140a is formed at a base part (fixed end) of the first cushioning member 140. The reduced-diameter portion 140c forms an annular recess between the first cushioning member 140 and the piston rod 108. The annular recess engages with the inner circumference of the ring-shaped first damper 138 composed of an elastic member to thereby hold the first damper 138.

The first cushion seal 144 is held by the inner circumference of a ring-shaped first holder 148. The first holder 148 has a hole 148a passing through the first holder 148 in the axial direction and is secured to the inner circumference of the first stepped portion 112 of the head cover 104. While the first cushioning member 140 is not inserted into the hole 148a of the first holder 148, the slide hole 103 and the first central hollow portion 116 communicate with each other via the hole 148a.

The first cushion seal 144 protrudes inward from the inner circumferential surface of the first holder 148 defining the hole 148a. Thus, when the first cushioning member 140 is inserted into the hole 148a of the first holder 148, the first cushion seal 144 is brought into sliding contact with the outer circumferential surface of the first cushioning member 140 around the entire circumference.

The second cushioning member 142 is disposed next to a side of the piston unit 18 closer to the rod cover 106 (a side located in the direction of the arrow X1) to be coaxial with the piston rod 108 in the vicinity of the piston unit 18. The second cushioning member 142 is a ring-shaped member with a diameter larger than the diameter of the piston rod 108 and smaller than the diameter of the piston unit 18, and is joined to the outer circumferential surface of the piston rod 108 by, for example, welding or bonding. In FIG. 13, the outer diameter of the second cushioning member 142 is slightly larger than the outer diameter of the piston rod 108.

The second cushioning member 142 includes a straight portion 142a and a tapered portion 142b on the outer circumference of the second cushioning member 142. The straight portion 142a has a fixed outer diameter in the axial direction. The tapered portion 142b is disposed adjoining an end of the straight portion 142a located in the direction of the arrow X1 (a side closer to the rod cover 106) and has a diameter gradually reducing in the direction of the arrow X1.

The second cushion seal 146 is held by the inner circumference of a ring-shaped second holder 150. The second holder 150 has a hole 150a passing through the second holder 150 in the axial direction and is secured to the inner circumference of the second stepped portion 120 of the rod cover 106. While the second cushioning member 142 is not inserted in the hole 150a of the second holder 150, the slide hole 103 and the second central hollow portion 124 communicate with each other via the hole 150a.

The second cushion seal 146 protrudes inward from the inner circumferential surface of the second holder 150 defining the hole 150a. Thus, when the second cushioning member 142 is inserted into the hole 150a of the second holder 150, the second cushion seal 146 is brought into sliding contact with the outer circumferential surface of the second cushioning member 142 over the entire circumference.

Next, the operation of the fluid pressure cylinder 10D configured as above will be described. In the description below, air (compressed air) will be used as pressurized fluid. However, gas other than air may be used.

In the fluid pressure cylinder 10D, the piston unit 18 is moved inside the slide hole 103 in the axial direction by action of pressurized fluid introduced via the first port 118 or the second port 126. This causes the piston rod 108 connected to the piston unit 18 to reciprocate.

Specifically, while the piston unit 18 is located at the retracted position illustrated in FIG. 13, the second port 126 is opened to the atmosphere, and air is supplied from a pressurized fluid supply source (not illustrated) to a first pressure chamber 103a via the first port 118, the first central hollow portion 116, and the hole 148a. The air pushes the piston unit 18 toward the rod cover 106. Thus, the piston unit 18 is displaced (advanced) toward the rod cover 106 together with the piston rod 108. In this case, the air inside a second pressure chamber 103b is discharged from the second port 126 via the hole 150a of the second holder 150 and the second central hollow portion 124.

When the second damper 68 comes into abutment against the second holder 150, the advancing motion of the piston unit 18 is stopped. Thus, the second damper 68 relieves impact and impact noise occurring when the piston unit 18 reaches the advanced position (stroke end on the rod cover 106 side). The second damper 68 may have a size sufficiently large to come into abutment against the rod cover 106 (and the second holder 150) when the piston unit 18 reaches the advanced position.

When the piston unit 18 approaches the advanced position, the second cushioning member 142 is inserted into the hole 150a of the second holder 150. This causes the inner circumference of the second cushion seal 146 to come into contact with the outer circumferential surface (straight portion 142a) of the second cushioning member 142 and thus creates an airtight seal at the contact area. The airtight seal prevents the air from flowing from the second pressure chamber 103b to the second central hollow portion 124 via the hole 150a. The air is discharged via small holes (not illustrated) to the second port 126 at a small flow rate.

As a result, an air cushion is formed in the second pressure chamber 103b. The air cushion in the second pressure chamber 103b serves as displacement resistance during the displacement of the piston unit 18 toward the rod cover 106 and decelerates the displacement of the piston unit 18 in the vicinity of the stroke end on the rod cover 106 side. Consequently, impact occurring when the piston unit 18 reaches the stroke end is further relieved.

On the other hand, while the piston unit 18 is located at the advanced position (stroke end on the rod cover 106 side), the first port 118 is opened to the atmosphere, and air is supplied from the pressurized fluid supply source (not illustrated) to the second pressure chamber 103b via the second port 126, the second central hollow portion 124, and the hole 150a. The air pushes the piston unit 18 toward the head cover 104. This causes the piston unit 18 to be displaced (retracted) toward the head cover 104. In this case, the air inside the first pressure chamber 103a is discharged from the first port 118 via the hole 148a of the first holder 148 and the first central hollow portion 116.

When the piston unit 18 approaches the retracted position, the first cushioning member 140 is inserted into the hole 148a of the first holder 148. This causes the inner circumference of the first cushion seal 144 to come into contact with the outer circumferential surface (straight portion 140a) of the first cushioning member 140 and thus creates an airtight seal at the contact area. The airtight seal prevents the air from flowing from the first pressure chamber 103a to the first central hollow portion 116 via the hole 148a.

As a result, an air cushion is formed in the first pressure chamber 103a. The air cushion in the first pressure chamber 103a serves as displacement resistance during the displacement of the piston unit 18 toward the head cover 104 and decelerates the displacement of the piston unit 18 in the vicinity of the stroke end on the head cover 104 side. Consequently, impact occurring when the piston unit 18 reaches the stroke end is further relieved.

In this case, the ring-shaped second cushioning member 142 is joined to the outer circumferential surface of the piston rod 108 in this embodiment. Thus, in the assembly process (production process), the second cushioning member 142 can be attached to the outer circumferential surface of the piston rod 108 after assembling a piston assembly 74c including the piston unit 18 and the piston rod 108 by stacking the plurality of members (such as the wear ring 44) and the packing 34 on the first piston member 40 integrated with the piston rod 108 in the axial direction.

Consequently, the cushioning mechanism 110 can be easily obtained while the structure of the piston unit 18 that can be assembled by stacking the components in the axial direction (structure which makes it easy to automate assembly process) is adopted.

Figure 14A:
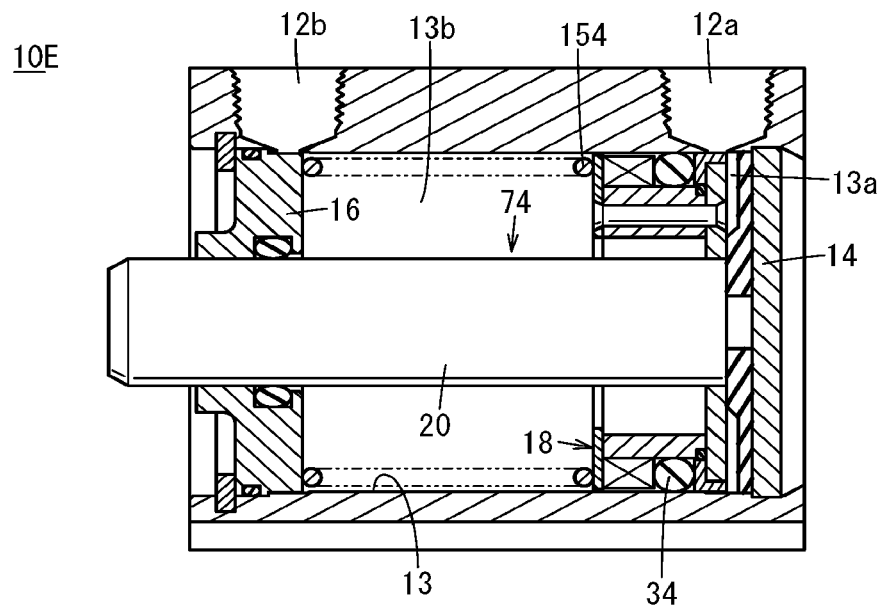
FIG. 14A is a cross-sectional view of a fluid pressure cylinder according to a fifth embodiment of the present invention.

The fluid pressure cylinder 10E according to the fifth embodiment illustrated in FIG. 14A is configured as a so-called single-acting cylinder. Specifically, the fluid pressure cylinder 10E has a structure similar to the structure of the fluid pressure cylinder 10A according to the first embodiment except that the second damper 68 is removed and that a spring 154 is alternatively disposed between the piston unit 18 and the rod cover 16. In this case, the second port 12b is open to the atmosphere.

In the fluid pressure cylinder 10E, when pressurized fluid is supplied to the first pressure chamber 13a via the first port 12a, the piston unit 18 is displaced (advanced) toward the rod cover 16 by the pressurized fluid and reaches the stroke end at the advanced position. When the supply of the pressurized fluid to the first port 12a is stopped and the first port 12a is opened to the atmosphere, the piston unit 18 is displaced (retracted) toward the head cover 14 by the elastic biasing force of the spring 154 and reaches the stroke end at the retracted position.

Figure 14B:
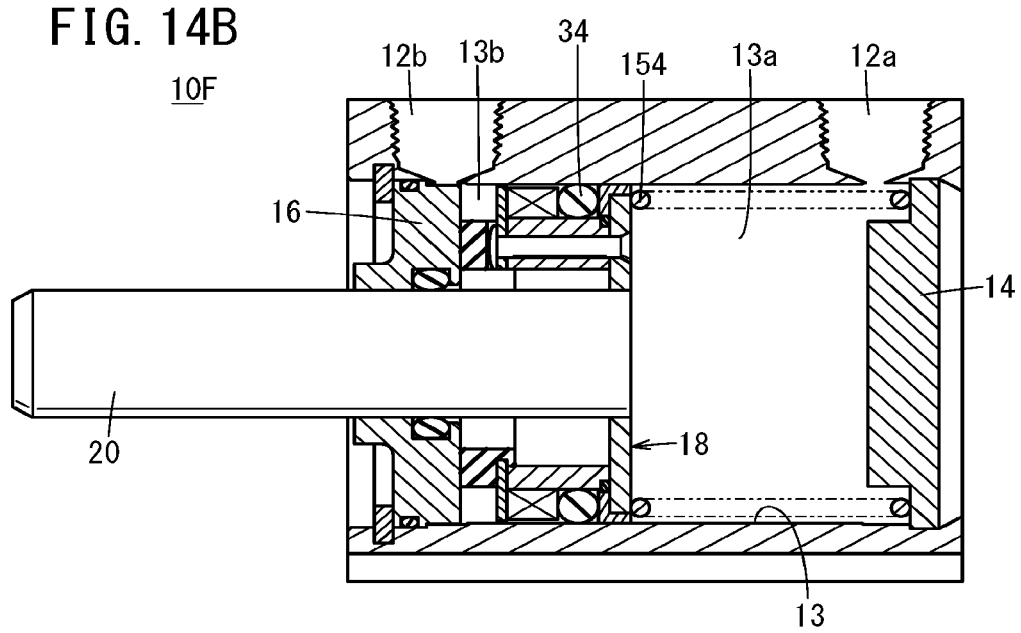
FIG. 14B is a cross-sectional view of a fluid pressure cylinder according to a sixth embodiment of the present invention.

The fluid pressure cylinder 10F according to the sixth embodiment illustrated in FIG. 14B is also configured as a so-called single-acting cylinder. Specifically, the fluid pressure cylinder 10F has a structure similar to the structure of the fluid pressure cylinder 10A according to the first embodiment except that the first damper 22 is removed and that the spring 154 is alternatively disposed between the piston unit 18 and the head cover 14. In this case, the first port 12a is exposed to the atmosphere.

In the fluid pressure cylinder 10F, when pressurized fluid is supplied to the second pressure chamber 13b via the second port 12b, the piston unit 18 is displaced (retracted) toward the head cover 14 by the pressurized fluid and reaches the stroke end at the retracted position. When the supply of the pressurized fluid to the second port 12b is stopped and the second port 12b is opened to the atmosphere, the piston unit 18 is displaced (advanced) toward the rod cover 16 by the elastic biasing force of the spring 154 and reaches the stroke end at the advanced position.

The present invention is not limited to the above-described embodiments, and various modifications can be made without departing from the scope of the present invention. For example, the present invention is applicable to fluid pressure cylinders provided with piston units and cylinder tubes with non-circular (quadrangular or elongated circular such as elliptical) cross-sections. Moreover, the present invention is also applicable to multi-rod (such as dual rod) fluid pressure cylinders provided with a plurality of pistons and piston rods.

Yet moreover, the present invention is not limited to the fluid pressure cylinders used as actuators or the like, and is also applicable to different forms of fluid pressure device including pistons. The different forms of fluid pressure device equipped with pistons, to which the present invention is applicable, include, for example, a valve device for switching channels by moving a valve element using a piston, a length-measurement cylinder for measuring length by displacing a piston connected with a piston rod serving as an input shaft, a sliding table connected to a piston and configured to be displaced by displacing the piston via a piston rod, and a chuck device for gripping a workpiece using a gripping part that opens and closes by displacing a piston and then converting the displacement of a piston.

The invention claimed is:

1. A fluid pressure device comprising:
a body having a slide hole inside the body;
a piston unit movable in an axial direction inside the slide hole; and
a piston rod protruding from the piston unit in the axial direction; wherein:
the piston unit includes a packing and a piston body comprising a plurality of members, the piston body including a packing mounting groove in which the packing is mounted;
the plurality of members of the piston body include a first piston member protruding outward from the piston rod and a second piston member disposed adjoining the first piston member;
the packing is disposed on an outer circumferential part of the second piston member;
a combination of at least two members of the plurality of members defines the packing mounting groove;
the plurality of members of the piston body further include a fixing plate having an outer diameter larger than an outer diameter of the second piston member, the fixing plate being disposed adjoining the second piston member on a side of the second piston member that is remote from the first piston member; and
the packing is disposed between the first piston member and the fixing plate.

2. The fluid pressure device according to claim 1, wherein the first piston member, the second piston member, and the fixing plate are fastened together in the axial direction by a connecting pin.

3. The fluid pressure device according to claim 1, wherein:

the plurality of members of the piston body further include a wear ring made of a low friction material and disposed so as to surround an outer circumferential part of the first piston member, and a magnet disposed adjoining the fixing plate; and an outer circumferential surface of the second piston member, an end surface of the wear ring define the packing mounting groove.

4. The fluid pressure device according to claim 3, wherein a gasket is disposed between the first piston member, the second piston member, and the wear ring.

5. The fluid pressure device according to claim 1, wherein the fixing plate is provided with a damper made of an elastic material.

6. The fluid pressure device according to claim 1, wherein a cavity is formed between the second piston member and the piston rod.

7. The fluid pressure device according to claim 1, wherein a damper made of an elastic material is disposed between an inner circumferential part of the second piston member and an outer circumferential part of the piston rod along an axial direction of the piston rod.

8. The fluid pressure device according to claim 1, further comprising:
   a cushioning mechanism configured to form a gas cushion to thereby decelerate the piston unit when the piston unit approaches a stroke end;
   wherein the cushioning mechanism includes a cushion ring joined to an outer circumferential surface of the piston rod.

9. The fluid pressure device according to claim 1, wherein the first piston member protrudes outward from an end portion of the piston rod, and the second piston member protrudes in an axial direction away from the piston rod.

10. The fluid pressure device according to claim 1, wherein an external size of the second piston member is smaller than an external size of the first piston member.

11. The fluid pressure device according to claim 1, wherein an external size of the second piston member is larger than an external size of the first piston member.

12. The fluid pressure device according to claim 1, wherein the fluid pressure device is configured as a fluid pressure cylinder, a valve device, a length-measurement cylinder, a sliding table, or a chuck device.

13. A method for producing a piston assembly provided with a piston unit and a piston rod protruding from the piston unit in an axial direction,
   the piston unit including a packing and a piston body comprising a plurality of members, the piston body including a packing mounting groove in which the packing is mounted;
   the plurality of members of the piston body including a first piston member protruding outward from the piston rod and a second piston member disposed adjoining the first piston member;
   the packing being disposed on an outer circumferential part of the second piston member;
   a combination of at least two members of the plurality of members defining the packing mounting groove;
   the plurality of members of the piston body further including a fixing plate having an outer diameter larger than an outer diameter of the second piston member, the fixing plate being disposed adjoining the second piston member on a side of the second piston member that is remote from the first piston member; and
   the packing being disposed between the first piston member and the fixing plate,
   the method comprising the steps of:
   providing a piston rod member including the piston rod and a first piston member protruding outward from the piston rod;
   stacking the second piston member and the packing on the first piston member by relatively moving the second piston member and the packing in the axial direction in sequence relative to the piston rod member; and
   relatively moving the fixing plate in the axial direction relative to the piston rod member, thereby stacking the fixing plate on the first piston member, the second piston member and the packing, wherein:
   the first piston member, the second piston member and the fixing plate constitute a piston body provided with the packing mounting groove; and
   a combination of the first piston member, the second piston member and the fixing plate defines the packing mounting groove.

14. The method for producing the piston assembly according to claim 13, wherein a distal end portion of the piston rod member is directed upward in the step of stacking.

* * * * *